United States Patent
Weine Ramsey

(10) Patent No.: US 7,425,586 B2
(45) Date of Patent: *Sep. 16, 2008

(54) ENVIRONMENTALLY FRIENDLY, 100% SOLIDS, ACTINIC RADIATION CURABLE COATING COMPOSITIONS AND COATED SURFACES AND COATED ARTICLES THEREOF

(75) Inventor: Sally Judith Weine Ramsey, Tallmadge, OH (US)

(73) Assignee: Ecology Coatings, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/609,283

(22) Filed: Dec. 11, 2006

(65) Prior Publication Data

US 2007/0082964 A1    Apr. 12, 2007

Related U.S. Application Data

(63) Continuation-in-part of application No. 10/983,022, filed on Nov. 5, 2004, now Pat. No. 7,151,123, which is a continuation-in-part of application No. 10/771,867, filed on Feb. 4, 2004, now abandoned, and a continuation-in-part of application No. 10/872,531, filed on Jun. 21, 2004, now abandoned.

(60) Provisional application No. 60/551,287, filed on Mar. 8, 2004.

(51) Int. Cl.
    C08F 2/46    (2006.01)
    C08F 2/50    (2006.01)
    B32B 9/04    (2006.01)
    B32B 9/00    (2006.01)

(52) U.S. Cl. .................. 522/74; 522/90; 522/96; 522/100; 522/103; 522/104; 522/107; 522/150; 522/153; 522/152; 522/168; 522/170; 522/172; 522/174; 522/99; 522/178; 522/181; 522/182

(58) Field of Classification Search .......... 522/96, 522/100, 181, 153, 173, 150, 74, 83, 90, 522/99, 103, 104, 107, 152, 168, 170, 174, 522/178, 182

See application file for complete search history.

(56) References Cited

U.S. PATENT DOCUMENTS

| | | | |
|---|---|---|---|
| 4,163,809 A | 8/1979 | McGinniss et al. |
| 4,188,455 A | 2/1980 | Howard |
| 4,210,687 A | 7/1980 | Obendorf et al. |
| 4,234,466 A | 11/1980 | Takahashi et al. |
| 4,302,503 A | 11/1981 | Mattimoe |
| 4,522,958 A | 6/1985 | Das et al. |
| 4,526,910 A | 7/1985 | Das et al. |
| 4,610,115 A | 9/1986 | Thompson |
| 4,652,470 A | 3/1987 | Das et al. |
| 4,721,734 A | 1/1988 | Gehlhaus et al. |
| 4,822,828 A | 4/1989 | Swofford |
| 5,182,148 A | 1/1993 | Kapp et al. |
| 5,300,326 A | 4/1994 | Zezinka |
| 5,425,970 A | 6/1995 | Lahrmann |
| 5,453,451 A | 9/1995 | Sokol |
| 5,733,607 A | 3/1998 | Mangum et al. |
| 5,773,487 A | 6/1998 | Sokol |
| 6,001,427 A | 12/1999 | Breazeale |
| 6,039,798 A | 3/2000 | Aldcroft et al. |
| 6,110,593 A | 8/2000 | Szum |
| 6,203,913 B1 | 3/2001 | Kondos |
| 6,337,108 B1 | 1/2002 | Yamaguchi et al. |
| 6,399,670 B1 | 6/2002 | MacQueen et al. |
| 6,426,034 B1 | 7/2002 | McComas et al. |
| 6,467,897 B1 | 10/2002 | Wu et al. |
| 6,539,389 B1 | 3/2003 | Geiner |
| 6,541,076 B2 | 4/2003 | Dunkle |
| 6,682,872 B2 | 1/2004 | Sachdev et al. |
| 6,777,706 B1 | 8/2004 | Tessler |
| 6,784,222 B2 | 8/2004 | Zychowski et al. |
| 6,844,374 B2 | 1/2005 | Jin |
| 6,974,850 B2 | 12/2005 | McMan |

(Continued)

FOREIGN PATENT DOCUMENTS

EP    0342840    11/1989

(Continued)

OTHER PUBLICATIONS

Byk Chemie: Silicone Surface Additives with Strong Surface Tension Redusction—Data Sheet for BYK-306-344 (Jun. 2003). [online], [retrieved on Feb. 8, 2008]. Retrived from the Internet <URL:http://www.byk-chemie.com/output/download/S2__usa.pdf>.*

(Continued)

*Primary Examiner*—Sanza L McClendon
(74) *Attorney, Agent, or Firm*—Wilson Sonsini Goodrich & Rosati

(57) ABSTRACT

Disclosed are environmentally friendly, substantially all solids coating compositions which are curable using ultra violet and visible radiation. In addition, methods for coating surfaces, or at least a portion of the surfaces, and curing of the coated surface to obtain partially or fully cured coated surfaces are also disclosed. Furthermore, articles of manufacture incorporating fully cured coated surfaces are disclosed, in particular motor vehicles and motor vehicle parts or accessories.

19 Claims, 6 Drawing Sheets

U.S. PATENT DOCUMENTS

| | | | |
|---|---|---|---|
| 7,151,123 B2 * | 12/2006 | Ramsey | 522/96 |
| 7,192,992 B2 * | 3/2007 | Ramsey | 522/96 |
| 7,238,731 B2 * | 7/2007 | Ramsey | 522/90 |
| 2001/0051229 A1 | 12/2001 | Witt | |
| 2002/0028288 A1 | 3/2002 | Rohrbaugh et al. | |
| 2002/0032249 A1 | 3/2002 | Eckberg et al. | |
| 2002/0137872 A1 | 9/2002 | Schneider | |
| 2003/0008934 A1 | 1/2003 | Zychowski et al. | |
| 2003/0036604 A1 | 2/2003 | Meisenburg | |
| 2003/0045598 A1 | 3/2003 | Chen et al. | |
| 2003/0138733 A1 | 7/2003 | Sachdev et al. | |
| 2003/0185990 A1 | 10/2003 | Bittner et al. | |
| 2003/0207959 A1 | 11/2003 | Napadensky et al. | |
| 2004/0071949 A1 | 4/2004 | Glatkowski et al. | |
| 2005/0170101 A1 | 8/2005 | Ramsey | |
| 2005/0170280 A1 | 8/2005 | Ramsey | |
| 2005/0171227 A1 | 8/2005 | Ramsey | |

FOREIGN PATENT DOCUMENTS

WO     WO-2001-68375 A2     9/2001

OTHER PUBLICATIONS

Kaminski, Dennis, "Faster, Friendlier, and Fewer Rejects," Industrial Paint and Powder Magazine, Apr. 28, 2004.
Holl, Peter et al., "UV Curing-The Challenge in the Automotive Industry," UV Curing of Automotive Coatings- State of the Art, 2004, available from RadTech.org, presented at RadTech Europe Conference Oct. 8-10, 2001.
Nanocryl-Nanosilica Reinforced (Meth-)Acrylates Product Brochure, hanse chemie GmbH, 2003.
Breslin, D. et al., "New Acrylated Oligomers with Enhanced Pigment Wetting Properties," availabe from www.Sartomer.com, from RadTech 2000, Apr. 9-12, 2000.
Yang, B., Studies of Pigmented UV Curable Systems by Real Time FTIR, from www.Sartomer.com, from RadTech 2000, Apr. 9-12, 2000.
"Economic Considerations of True" 100% UV Curable Solids Paints and Coatings, Allied Photo-Chemical, Inc., Jun. 2002.
MSDS sheet [online] for Tint-AYD PC 9703 Phthalogreen from Elementis Specialties (Oct. 8, 1993). [retrieved on Aug. 19, 2005] from the internet http://www.elementis_specialties.com/index.asp?fuseaction=main.msds_results&ProdID=1731&Search=9703>.
European Coatings Show 2005 (Apr. 16, 2005), product presentation abstract for Nanocryl [online], presented by Dr. Ch Rocher for Hanse Chemie. [retrieved on Aug. 19, 2005]. Retrieved from Internet<URL:http://www.european_coatings-show.de/main/d89w7zjb/e66v>.
Koleske, J.V., "Mechanical Properties of Solid Coatings," Enc. Analyt. Chem. John WIley + SOns LTd., Chichester, pp. 1-15, Jan. 9, 2001.
Jacoby, M.,"Composite Materials," Chem. Eng. News., Am. Chem. Soc. 82:34-39 (2004).
Lawniczak, J. and Callahan, M., "Market and Technical Aspects for Obtaining Paint Adhesions to Plastic Parts," International Coatings for Plastic Symposium May 20-22, 2002, Troy, MI.
Modjewski, R.J., "UV Curing for Wood Applications," Radtech Report, May/Jun. 1999, pp. 45-48.
Nolte, U., "Synergistic Effects Between Alumina Nanoparticles and Conventional Additives," Oct. 1, 2005, http://www.pcimag.com/CDA/ArticleInformation/features/BNP_Features_Item/0.1846.161367.00.html.
Sartomer Application Bulletin,"Adhesion of Radiation Cured Coatings to Plastics," available from Sartomer, Exton, PA.
Sartomer Application Bulletin, "Adehsion promoters for UV/EB Cured Applications," available from Sartomer, Exton, PA.
Technical Support Document, "National Emission Standards for Hazardous Air Pollutants: Surface Coating of Plastic Parts and Products," EPA Sep. 2002.
Williams, K.A., "Nuts and Bolts: Getting the most out of cholorinated polyolefin (CPO) adhesion promoters," Paint & Coatings Industry, as www.pcimag.com posted Nov. 11, 2004.
WO05/076894 Search Report dated Mar. 10, 2006.

\* cited by examiner

US 7,425,586 B2

ENVIRONMENTALLY FRIENDLY, 100% SOLIDS, ACTINIC RADIATION CURABLE COATING COMPOSITIONS AND COATED SURFACES AND COATED ARTICLES THEREOF

CROSS-REFERENCE TO RELATED APPLICATIONS

This Application is a continuation-in-part of U.S. patent application Ser. No. 10/983,022, filed Nov. 5, 2004, now U.S. Pat. No. 7,151,123 which is a continuation-in-part-application of U.S. patent applications Ser. No. 10/771,867 filed Feb. 4, 2004, now abandoned and Ser. No. 10/872,531 filed Jun. 21, 2004, now abandoned which claims the benefit of U.S. Provisional Application Ser. No. 60/551,287, filed on Mar. 8, 2004, the disclosures of all of which are hereby incorporated by reference in their entirety.

BACKGROUND OF THE INVENTION

In general, most surfaces of man-made objects have some type of coating which has been applied in order fulfill some expected function, utility, or appearance. Man-made objects may be fabricated from natural or synthetic materials, and can range from flooring, which may require an abrasion resistant coating, to motor vehicle and motor vehicle parts which may require attractive, corrosion resistant coatings. Thus, coatings applied to surfaces typically serve decorative and/or protective functions. This is particularly so for automotive finishes, which must provide an esthetically appealing appearance while meeting and maintaining rigorous performance and durability requirements.

SUMMARY OF THE INVENTION

Presented herein are environmentally friendly actinic radiation curable, substantially all solids compositions and methods for coating a surface or at least a portion of a surface. Actinic radiation curable, all solids compositions are used for coating at least a portion of the surface of an object. Such coating compositions produce less volatile materials, produce less waste and require less energy to be coated on an object. Furthermore, such coating compositions may be used to produce coatings having desirable esthetic, performance and durability properties. Further presented are partially and fully cured surfaces, along with articles of manufacture incorporating fully cured surfaces.

In one aspect the actinic radiation curable, substantially all solids compositions described herein are comprised of a mixture of oligomers, monomers, photoinitiators, co-photoinitiators, fillers, and polymerizable pigment dispersions. In one embodiment of the this aspect, the actinic radiation curable, substantially all solids composition mixture may comprise 0-40% percent by weight of oligomer or mixture of oligomers, plus monomers, photoinitiators, co-photoinitiators, fillers, and polymerizable pigment dispersions.

In another embodiment of the above aspect, the actinic radiation curable, substantially all solids composition mixture comprises 5-68% by weight monomer or mixture of monomers; plus oligomers, photoinitatiors, co-photoinitiators, fillers, and polymerizable pigment dispersions. In a further embodiment of the aforementioned aspect, the actinic radiation curable, substantially all solids composition mixture comprises 3-15% photoinitiator or mixture of photoinitiators and co-initiators; plus oligomers, monomers, fillers, and polymerizable pigment dispersions. In a still further embodiment of the above aspect, the actinic radiation curable, substantially all solids composition mixture comprises 0.5-11% filler or mixture of fillers; plus oligomers, monomers, photoinitatiors, co-photoinitiators, and polymerizable pigment dispersions. In yet another embodiment of the aforementioned aspect, the actinic radiation curable, substantially all solids composition mixture comprises 3-15% polymerizable pigment dispersion or mixture of polymerizable pigment dispersions; plus oligomers, monomers, photoinitatiors, co-photoinitiators, and fillers. In an embodiment of the above aspect, the actinic radiation curable, substantially all solids composition comprises 0-40% percent by weight of oligomer or mixture of oligomers, and 5-68% by weight monomer or mixture of monomers; plus photoinitatiors, co-photoinitiators, fillers, and polymerizable pigment dispersions. In another embodiment of the aforementioned aspect, the actinic radiation curable, substantially all solids composition comprises 0-40% percent by weight of oligomer or mixture of oligomers, 5-68% by weight monomer or mixture of monomers and 3-15% photoinitiator or mixture of photoinitiators and co-initiators; plus, fillers, and polymerizable pigment dispersions. In a further embodiment of the above aspect, the actinic radiation curable, substantially all solids composition mixture comprises 0-40% percent by weight of oligomer or mixture of oligomers, 5-68% by weight monomer or mixture of monomers, 3-15% photoinitiator or mixture of photoinitiators and co-initiators and 0.5-11% filler or mixture of fillers; plus polymerizable pigment dispersions. In still further embodiment of the aforementioned aspect, the actinic radiation curable, substantially all solids composition mixture comprises 0-40% percent by weight oligomer or mixture of oligomers, 5-68% by weight monomer or mixture of monomers, 3-15% photoinitiator or mixture of photoinitiators and co-initiators, 0.5-11% filler or mixture of fillers, and 3-15% solid polymerizable pigment dispersion or mixture of solid polymerizable dispersions; whereby the room temperature viscosity of the composition is up to about 500 centipoise.

In a further or alternative embodiment, the oligomers are selected from a group consisting of epoxy acrylates, epoxy diacrylate/monomer blends, silicone acrylate, aliphatic urethane triacrylate/monomer blends, fatty acid modified bisphenol A acrylates, bisphenol epoxy acrylates blended with trimethylolpropane triacrylate, aliphatic urethane triacrylates blended with 1,6-hexanediol acrylate, and combinations thereof. In a further or alternative embodiment, the monomers are selected from a group consisting of trimethylolpropane triacrylate, 2-phenoxyethyl acrylate, isobornyl acrylate, propoxylated glyceryl triacrylate, methacrylate ester derivatives, and combinations thereof.

In a still further or alternative embodiment, the photoinitiators are selected from a group consisting of phosphine oxide type photoinitiators, diphenyl (2,4,6-trimethylbenzoyl) phosphine oxide, a thioxanthone, dimethyl ketal, benzophenone, 1-hydroxycyclohexyl phenyl ketone, 2-hydroxy-2-methyl-1-phenyl-propan-1-one, 2,4,6,-trimethylbenzophenone, 4-methylbenzophenone, oligo (2-hydroxy-2-methyl -1-(4-(1-methylvinyl)phenyl)propanone), amine acrylates, and combinations thereof.

In a still further or alternative embodiment, the fillers are selected from a group consisting of amorphous silicon dioxide prepared with polyethylene wax, synthetic amorphous silica with organic surface treatment, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof. Further, the average size of the filler particles is less than 500 nanometers, or less than 100 nanometers, or less than 50 nanometers, or even less than 25 nanometers.

In a still further or alternative embodiment, the polymerizable pigment dispersions are comprised of pigments attached to activated resins, such as acrylate resins, methacrylate resins, or vinyl resins, and, wherein, the pigments are selected from a group consisting of carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red.

In a still further or alternative embodiment, the actinic radiation curable, substantially all solids composition may also contain a corrosion inhibitor, wherein the corrosion inhibitor is an all solids corrosion inhibitor present in an amount up to about 3% by weight. A further embodiment is the incorporation of M-235 (Cortec Corporation's (4119 White Bear Parkway, St. Paul, Minn. 55110 U.S.A.)) as a corrosion inhibitor.

In a still further or alternative embodiment, the actinic radiation curable, substantially all solids composition includes flow and slip enhancers. In a still further or alternative embodiment, the flow and slip enhancer are added to the composition in an amount up to about 3% by weight. In a still further or alternative embodiment the flow and slip enhancer are selected from a group consisting of acrylated silicone, EBECRYL® 350 (UCB Surface Specialties, Brussels, Belgium), EBECRYL® 1360 (UCB Surface Specialties, Brussels, Belgium), and CN990 (Sartomer, Exton, Pa., U.S.A.).

In a still further or alternative embodiment, the actinic radiation curable, substantially all solids composition includes curing boosters. In a still further or alternative embodiment, the curing boosters are present in an amount up to about 0.5% by weight. In a still further or alternative embodiment, the curing booster is thioxanthone.

In a still further or alternative embodiment, the actinic radiation curable, substantially all solids composition has a room temperature viscosity of up to about 500 centipoise.

In another aspect the coated surfaces are obtained by coating surfaces with the actinic radiation curable, substantially all solids composition. In further or alternative embodiments, the coated surfaces are coated metals, coated wood, coated plastic, coated stone, coated glass, or coated ceramic.

In further or alternative embodiments, the coating can be applied to the surface by means of spraying, brushing, rolling, dipping, blade coating, curtain coating or a combination thereof. Further, the means of spraying includes, but is not limited to, the use of a high pressure low volume spraying systems, or electrostatic spraying systems. In further or alternative embodiments, the coating is applied in a single application, or in multiple applications. In further or alternative embodiments, the surface is partially covered by the coating, or in a still in still further or alternative embodiments, the surface is fully covered by the coating.

In further or alternative embodiments, the coated surfaces are partially cured by exposure of the coated surfaces to a first source of actinic radiation. In further or alternative embodiments, the partially cured surfaces are opaque or glossy, or opaque and glossy.

In further or alternative embodiments, the coated surfaces are fully cured by exposure of the partially cured coated surface to a second source of actinic radiation. In further or alternative embodiments, the fully cured surfaces are opaque, hard, glossy, corrosion resistant, and abrasion resistant.

In further or alternative embodiments, the actinic radiation is selected from the group consisting of visible radiation, near visible radiation, ultra-violet (UV) radiation, and combinations thereof. Further, the UV radiation is selected from the group consisting of UV-A radiation, UV-B radiation, UV-B radiation, UV-C radiation, UV-D radiation, or combinations thereof.

In further or alternative embodiments, the completely cured coated surface is part of articles of manufacture. In further or alternative embodiments, the articles of manufacture include the completely cured coated surface. In further or alternative embodiments, the article of manufacture is selected from the group consisting of motor vehicles, motor vehicle parts, motor vehicle accessories, gardening equipment, lawnmowers, and lawnmower parts. In further or alternative embodiments, the motor vehicle parts are underhood parts including, but not limited to, oil filters, dampers, battery casings, alternator casings, and engine manifolds.

In another aspect the completely cured coated surfaces of the articles of manufacture are stable to one or more testing conditions. In further or alternative embodiments, the completely cured coated surfaces exhibits no marking after contact with at least 10% sulfuric acid at a temperature of at least 65° C. for at least 6 minutes. In further or alternative embodiments, the completely cured coated surfaces exhibits no marking after contact with at least 10% sulfuric acid at a temperature of at least 65° C. for at least 12 minutes. In further or alternative embodiments, the completely cured coated surfaces exhibits no softening and no blistering after immersion in engine coolant for at least 8 hours at a temperature of at least 60° C. In further or alternative embodiments, the coated surfaces exhibits no softening and no blistering after immersion in engine coolant for at least 20 hours at a temperature of at least 60° C. In further or alternative embodiments, the completely cured coated surfaces exhibits no softening and no blistering after immersion in power steering oil for at least 8 hours at a temperature of at least 60° C. In further or alternative embodiments, the completely cured coated surfaces exhibits no softening and no blistering after immersion in power steering oil for at least 24 hours at a temperature of at least 60° C. In further or alternative embodiments, the completely cured coated surfaces exhibits no surface corrosion after 400 hours of exposure to salt spray. In further or alternative embodiments, the completely cured coated surfaces exhibits no surface corrosion after 900 hours of exposure to salt spray. In further or alternative embodiments, the completely cured coated surfaces exhibits no loss of adhesion after heating at a temperature of at least 200° C. in a convection oven for at least 1 hour. In further or alternative embodiments, the completely cured coated surfaces exhibits no loss of adhesion after heating at a temperature of at least 200° C. in a convection oven for at least 10 hours.

In another aspect the articles of manufacture are motor vehicles selected from the group consisting of automobiles, buses, trucks, tractors, and off-road vehicles. In further or alternative embodiments, the articles of manufacture are motor vehicle accessories or motor vehicle parts for motor vehicles, such as, but not limited to, automobiles, buses, trucks, and off-road vehicles.

In further or alternative embodiments, the article of manufacture are lawnmowers In a further aspect the method for producing the actinic radiation curable, substantially all solids composition involves adding the components, for instance, by way of example only, at least one oligomer, at least one monomer, at least one photoinitiator, at least one co-photoinitiator, at least one filler, and at least one polymerizable pigment dispersion, to a container and using a means for mixing the components to form a smooth composition. In further or alternative embodiments, the composition can be mixed in or transferred to a suitable container, such as, but not limited to, a can.

The compositions, methods and articles described herein relate generally to the field of coatings and more specifically to a composition of matter, comprising UV curable material, photoinitiators, fillers, and solid pigment dispersions which may be sprayed by conventional HVLP or electrostatic bell, with no additional heat, applicable in one coat, as a finish for metal. Also described herein are compositions and processes for applying a 100% solids, UV curable, opaque, corrosion resistant finish to parts for underhood use in motor vehicles.

An object is to produce opaque, corrosion resistant, UV curable coatings without the milling. Another object is to produce opaque UV curable coatings with no addition of vehicle. Another object is to decrease production time. Another object is to save space. Another object is to reduce emissions. Yet another object is to improve color reproducibility and stability. Another object is to improve the appearance of coated articles. Still yet another object is to produce a product applicable by HVLP or electrostatic bell without the use of any heating apparatus. Another object is to produce opaque, corrosion resistant coatings which may be applied to metals in one coat. Still yet another object is to provide energy savings of up to 80%. Another object is to provide cost savings. Another object is to utilize less space. A further object is to eliminate the need for air pollution control technology. Another object is to produce visually acceptable parts. A further object is to equal or exceed previous performance of parts as to corrosion resistance. Yet another object is to cut production time.

INCORPORATION BY REFERENCE

All publications, patents and patent applications mentioned in this specification are herein incorporated by reference in their entirety to the same extent as if each individual publication, patent or patent application was specifically and individually indicated to be incorporated by reference.

BRIEF DESCRIPTION OF THE FIGURES

A better understanding of the features and advantages of the present methods and compositions may be obtained by reference to the following detailed description that sets forth illustrative embodiments, in which the principles of our methods, compositions, devices and apparatuses are utilized, and the accompanying drawings of which.

DETAILED DESCRIPTION OF THE INVENTION

Figure 1:
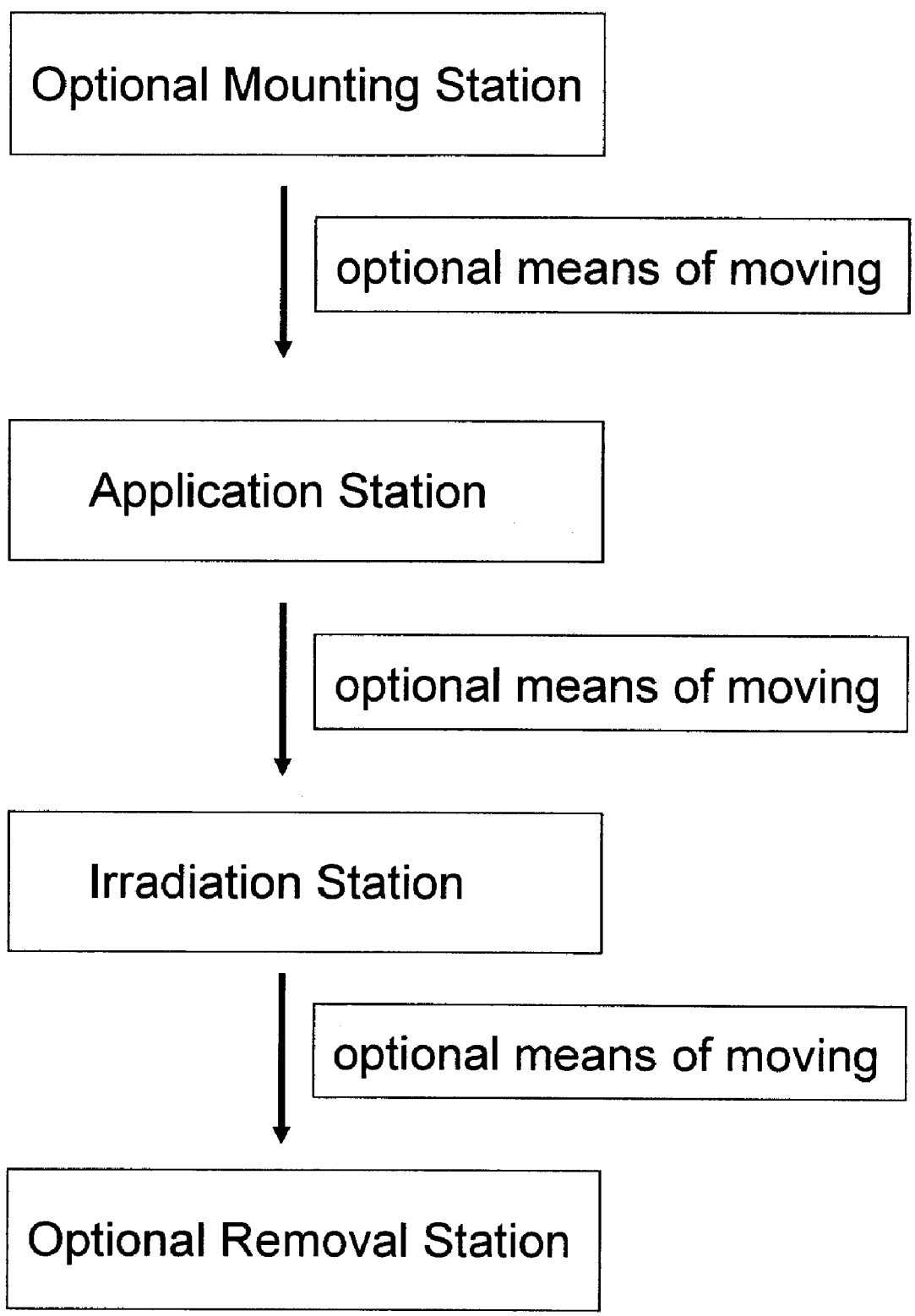
FIG. 1 is a flowchart of the process used to obtain an object with a completely cured coating of the described compositions.

The 100% solids, actinic radiation curable coating compositions, methods of applying the composition, coated surfaces and coated articles described herein, materially enhance the quality of the environment by incorporation of components which are zero or near zero volatile organic compounds (VOC's). Further, such components are essentially non-volatile and therefore have zero or near zero emissions. Such a decrease in emissions significantly decreases air pollution, especially in comparison to the air pollution encountered with coating composition using volatile solvents. In addition, any water and soil pollution associated with waste disposal from processes using coating composition using volatile solvents is minimized using the methods described herein, thereby further contributing to and materially enhancing the quality of the environment. Furthermore, the 100% solids, actinic radiation curable coating compositions, methods, processes and assemblages for applying the compositions, coated surfaces and coated articles described herein, utilize significantly less energy than processes using coating composition using volatile solvents, thereby conserving energy. As used herein, the term "actinic radiation", refers to any radiation source which can produce polymerization reactions, such as, by way of example only, ultraviolet radiation and visible light.

1. Coatings

Coatings have been applied to surfaces using either solvent-based systems, including aqueous or non-aqueous solvent-based systems, or powders. The non-aqueous solvent based systems include organic solvents, oils, or alcohols. Organic solvents have properties that make them very desirable in coatings application. Traditionally, paint manufacturers have relied on organic solvents to act as the carrier to evenly disperse the paints over the surface and then evaporate quickly. To achieve this, the organic solvents are used to thin/dilute the coating compositions. However, due to their high volatility such organic solvents create high emission concentrations and are therefore classified as Volatile Organic Compounds (VOC's) and Hazardous Air Pollutants (HAP's). These solvent emissions are of concern to employers and employees, as overexposure can cause renal damage or other health related difficulties. Furthermore, environmental issues, and potential fire hazards are other issues to consider when using coatings which incorporate organic solvents. These aspects may ultimately result in financial ramifications, including medical expenses, environmental cleanup, and insurance premiums. Another aspect associated with the solvent-based coating formulations, as well as powder coatings, is that large areas are needed to accomplish thermal curing. This requires a significant financial commitment from the coating end user, in terms of leasing or purchasing space, and the cost of energy associated with the thermal curing process.

2. Thermoset Powder Coatings

Powder-based coating compositions and aqueous-based formulations were developed to address the issue of volatile emissions associated with non-aqueous solvent-based systems. Powder-based coatings, which can include thermoset or UV-cure formulations, may decrease emissions, however due to the need for thermal melting, smoothing and curing (for thermoset powders); such powder-based coatings also require considerable time, space, and energy. Water-based coatings decrease emissions, and may decrease energy usage when the coated articles are air dried. Such water-based coatings, nonetheless, still require considerable space and time outlays. Furthermore, water-based coatings promote flash-rusting, in which steel or other iron-based surfaces are oxidized as the water-borne coating is drying. Drying with hot air blowers or the use of vacuum systems may reduce or eliminate the flash rust. However, if the coated items are dried with heat, then there is no added benefit with respect to decreasing energy costs.

Powder coatings are composed of 100% solids material, with no solvents of any kind. All substrate wetting and flow is due to the melt viscosity of the binder at elevated temperature. Solid resin, pigments, curing agents and additives are premixed, melted and dispersed in an extruder between 100° to 130° Celsius. This molten blend is then squeezed into a thin ribbon, cooled, broken into flakes, and then ground into a fine powder.

Powder coatings can be applied using electrostatic deposition. The charged powder particles are attracted to, and uniformly coat, a part that has been grounded. The coated part is moved to an oven in which the powder melts and cures into a thin film. Extrusion thermal stresses and curing using thermo-setting has limited the development of powder coating to those which cure at temperatures below 150° Celsius. Further limitations occur as a result of resin cross-linking within the extruder. The extruder dwell time must thus be limited because such cross-linking can result in increased melt viscosity, more orange peel and possible defects caused by gel particle formation. Also, powder coatings which thermoset at 120° Celsius have cure times of 30-60 minutes. This time is not practical for temperature sensitive materials such as those containing plastic or engineered wood components. Furthermore, once the curing process has begun the melt viscosity increases immediately and stops further flow and leveling. Powder coatings can display an "orange peel" appearance which may be undesirable. Flow and leveling takes place within the first 30-90 seconds of cure, and therefore the degree of orange peel and smoothness is set in.

3. UV Curable Powder Coating

Solid resins which possess UV-reactive moieties, and retain the melt and flow characteristics needed to produce high quality coatings, allow for the creation of UV-curable powder coatings. These powder coatings combine the low energy, space efficient and fast cure characteristics observed with UV cure liquid coatings, with the convenience of powder coating application. Also, the combination of UV curing with powder coating technologies effectively separates the melt and flow stages from the curing stage. This thermal latency of UV powder coatings allows the coating to flow to maximum smoothness before curing by exposure to UV radiation. Thus, any substrate which withstands temperatures ranging from 100° to 120° Celsius can be coated using UV curable powder coatings. The powder manufacturing process for thermoset powders or UV cure powders is identical. The significant difference between thermoset powder coatings and UV cure powder coatings is that the applicability of thermoset powder coatings is limited by process, requiring thermal cure temperatures, whereas UV curable powder coatings have limitations resulting from powder storage conditions.

4. UV Curable Liquid Coating

Contemporary with the development of powder coatings was the development of UV-curable liquid coatings. These coatings utilized low molecular weight unsaturated and acrylated resins in combination with photoinitiators to produce a coating which is cured by radical polymerization when exposed to UV radiation. However, due to the highly viscous nature of these liquid UV coatings, material handling and application of the UV-curable liquid coatings to complex parts can be burdensome and difficult. These coatings often utilize organic solvents to thin/dilute the formulation as a means to effectively apply the coating to a surface. Consequently, the issues associated with the use of organic solvents, such as environmental, health, and monetary considerations, are also of concern with UV-curable liquid coatings.

5. 100% Solids, UV Curable Coating

A need exists for improved 100% solids UV curable coating compositions which are easily applied to surfaces and cure quickly without the use of large curing and drying ovens; thereby, decreasing production costs associated with owning/leasing space required for drying/curing ovens, along with the cost associated with the energy requirements for operation of drying/curing ovens. In addition, the UV curable coating compositions should result in a more efficient production process because the use of a single coating (i.e. one-coat finish) decreases the time associated with coating a product and results in immediate "pack and ship" capabilities. In addition, it would be advantageous if the UV-curable coating compositions imparted corrosion resistance, abrasion resistance, improved adhesion, and could be either opaque or clear coat finishes. Such advantageous UV-curable coating compositions should not contain volatile organic solvents, thereby limiting health, safety, and environmental risks posed by such solvents. Further advantages of such UV-curable coating compositions would be the use of solid pigment dispersions, thus limiting the need for "milling," as required with raw pigments.

A primary object of the methods, compositions, and processes described herein is to produce opaque, corrosion resistant, UV curable coatings without the milling. Milling refers to the powder manufacture processes of premixing, melting and grinding the powder coating formulation to obtain a powder suitable for spraying onto a surface. The addition of these steps to the coating process results in increased time and energy expenditures per article of manufacture coated. Removal of these steps streamlines the coating process and removes the associated milling costs, thus improving overall productivity and lowering business expenditures. As described herein, the replacement of pigment dispersions with polymerizable pigment dispersions, as well as the incorporation of adhesion promoter components, is an effective approach for creating opaque, corrosion resistant, UV-curable coatings without the need for milling.

Another object of the methods, compositions, and processes described herein is to produce opaque UV curable coatings with no addition of vehicle. In general, solvent based coating formulations incorporate four basic types of materials: pigment, resin (binder), solvent, and additives. The liquid portion of these formulations is called the "vehicle", and can involve both the solvent and the resin. Homogeneous pigment dispersions can be created by efficient mixing of insoluble pigment particle in the vehicle, and thereby create opaque coatings. The resin makes up the non-volatile portion of the vehicle, and aids in adhesion, determines coating cohesiveness, affects gloss, and provides resistance to chemicals, water, and acids/bases. Three types of resins are generally used: multiuse resins (acrylics, vinyls, urethanes, polyesters); thermoset resins (alkyds, epoxides); and oils. The type of solvent used in these formulations depends on the resin and are either an organic solvent (such as alcohols, esters, ketones, glycol ethers, methylene chloride, trichloroethane, and petroleum distillates), or water. The significant drawback associated with the use of these types of formulations results from the use of volatile solvents as part of the formulation vehicle. Although the low vapor pressure of the organic solvent is the characteristic desired to create coatings using these formulations, the corresponding solvent evaporation creates environmental, fire hazard, and worker health issues. Even the use of water, although not generally a fire hazard or having environmental or health issues, can create undesirable effects, such as flash rusting of metal surfaces. As described herein, the compositions and methods are 100% solids, thus eliminating the undesirable aspects of the vehicle found in typical coating formulations. In this regard, another object is to reduce emissions. Therefore, by using various higher vapor pressure resins as the composition vehicle, the use of any solvent is removed, and the associated solvent emission/evaporation issues are overcome.

A further object of the methods, compositions, and processes described herein is to eliminate the need for air pollution control technology. As discussed above, the UV-curable coating compositions described herein are environmentally friendly because solvents have been removed from the composition. This effectively decreases the corresponding solvent emissions, and, obviates the need to incorporate air pollution control technology into the manufacturing process. As a result, the methods and compositions described herein can result in further time (e.g., maintenance of air pollution control systems), space and money for an operation in which a coating step is integrated.

Another object of the methods, compositions, and processes described herein is to decrease or cut production time. An additional advantage resulting from using the methods and compositions described herein is that such compositions and methods result in the overall decrease in time required to apply, cure, and dry the coating. Although, conventional coating processes can be adapted to the coating compositions and methods described herein, the use of UV radiation, rather than heat, to initiate the polymerization process significantly decreases the curing time per article coated. Furthermore, the lack of solvent removes the requirement for using heat to drive off solvent, a process which adds significant time and cost to the coating procedure. The use of UV light for curing, and the removal of solvent from the composition, dramatically decreases the time for completion of the total coating process for each article coated. Thus, the overall production time per part is decreased, and this can manifest itself in two ways. First, more parts can be processed in the same time needed for solvent based methods, and second, fulfilling batch orders requires less time and therefore the costs associated with maintaining the production line will be lower.

Another object is to save space, or alternatively stated, another object of the invention is to utilize less space. Each of these aspects has unique benefits depending on whether an existing production line is modified, or a new production line is being designed. The ability to minimize the usage of space for production, whether it be floor space, wall space, or even ceiling space (in the situation when objects are hung from the ceiling), can be critical in terms of productivity, production costs and initial capital expenditure. The removal of the solvent from the UV cure composition allows for the removal of large ovens from the production line. These ovens are used to cure and to force the rapid evaporation of the solvent. Removing the ovens significantly decreases the volume, (floor, wall, and ceiling space) required for the production system, and in effect utilizes less space for existing production lines. Furthermore, the expense associated with operating the ovens is no longer an issue and the result is decreased production costs. For new production lines removal of these ovens from the design actually saves space, and hence a smaller building may be used to house the production line, thereby decreasing the construction costs. In addition, the capital expenditure for the new production line will be less because ovens are no longer required. Removal of the ovens results in one feature which is common to both saving space and utilizing less space; in particular, for the situation in which a given specific volume (floor, wall, and ceiling space) is to be utilized for production. This feature is the ability to have many production lines in parallel, and therefore increase productivity. That is, by utilizing less space in a pre-existing facility, multiple coating assembly lines may be housed in the space required by conventional, thermal-based assemblies.

Another aspect associated with the coating production line described herein is that the lower spatial requirements of the coating methods and compositions described herein can be integrated with the associated production line for an article of manufacture. For instance, with the removal of the large ovens, the streamlined coating production line can be inserted into, by way of example only, the production line of any underhood part used in motor vehicles, such as the production line for oil filters, brake rotors, or dampers. The term "motor vehicle", as used herein, refers to any vehicle which is self-propelled by mechanical or electrical power. Motor vehicles, by way of example only, include automobiles, buses, trucks, tractors, recreational vehicles, and off-road vehicles. In addition, the UV curable coating composition and associated production line can be inserted into production lines for small engines and engine components, such as lawn mowers, gardening equipment, such as hedge trimmers, edgers and the like.

Still yet another object of the invention is to provide energy savings of up to 80%. As noted above, coating compositions which are solvent based, whether organic solvent or aqueous based, require the use of heat to dry the coated surfaces and thereby force the evaporation of the solvent. Large ovens are used to accomplish this process, and it can be appreciated that there is a large cost associated with operating these ovens. Furthermore, the use of ventilation systems (for instance large fans), and air pollution control systems all require energy to operate. Therefore, the UV curable coatings, compositions and methods described herein create significant energy savings by not limiting (or eliminating) the need for large ovens, associated ventilation systems and air purification systems required for alternative thermal or solvent-based coating compositions and methods.

Another object of the invention is to provide cost savings. The various beneficial aspects obtained from the use of the UV curable coating compositions and methods described herein have been discussed; in particular removal of solvents and the associated emissions, which allows for the removal of large drying ovens, ventilation systems, and air pollution control systems from the manufacturing process, also allows for less manufacturing space. As a result, a cost savings is expected to be associated with the use of the UV curable coating composition and methods described herein.

Yet another object of the invention is to improve color reproducibility and stability. Pigment color properties such as, strength, transparency/opacity, glosses, shade, rheology, and light and chemical stability, are generally affected to a greater or lesser extent by the size and distribution of the pigment particles in the vehicle in which they are embedded. Pigment particles normally exist in the form of primary particle (50 µm to 500 µm), aggregates, agglomerates and flocculates. Primary particles are individual crystals, whereas aggregate are collections of primary particles bound together at their crystal faces, and agglomerates are a looser type of arrangement with primary particles and aggregates joined at corners and edges. Flocculates consist of primary particle aggregates and agglomerates generally arranged in a fairly open structure, which can be broken down in shear. However, after the shear is removed, or a dispersion is allowed to stand undisturbed, the flocculates can reform. The relationship between pigment particle size and the ability of a pigment vehicle system to absorb visible electromagnetic radiation is referred to as the color or tinctorial strength. The ability of a given pigment to absorb light (tinctorial strength) increases with decreasing particle diameter, and accordingly increased surface area. Thus, the ability to maintain the pigment at a minimum pigment particle size will yield a maximum tinctorial strength. The primary purpose of a dispersion is to break down pigment aggregates and agglomerates into the primary particles, and therefore achieve optimal benefits of a pigment both visually and economically. When used in a coating composition pigment dispersions exhibit increased tinctorial strength and provided enhanced gloss. However, of concern in obtaining an optimal dispersion is the number of processes involved in creating the pigment dispersion, such as agitating, shearing, milling, and grinding. If these processes are not accurately controlled then the possibility exists for batch to batch color variation and poor color reproducibility. Alternatively, polymerizable pigment dispersions, which exhibit minimal aggregation and agglomeration, are simply mixed into the coating composition and thereby improve color reproducibility by removing the need for these processes in the coating process. Furthermore, due to the reactive functionality of the polymerizable pigment dispersion, during polymerization the pigment becomes an integral part of the resulting coating because it is attached to the reactive functionality. This may impart greater color stability relative to pigment dispersions which simply entrap the pigment particles in the coating matrix. Thus, coatings which incorporate polymerizable pigment dispersions exhibit improved color reproducibility, and improved color stability, greater tinctorial strength and enhanced opacity and gloss. By way of example only, compositions described herein can exhibit acceptable opacity at thicknesses less than 50 microns.

Another object is to improve the appearance of coated articles, and another object is to produce visually acceptable parts. Gloss essentially refers to the smoothness and shine of a surface, and both of these properties are important when considering the visually appearance and ultimate visual acceptability of a coating. As discussed above, the incorporation of polymerizable pigment dispersions into the coating composition can yield greater tinctorial strength and enhanced gloss. Furthermore, the incorporation of fillers in the coating composition, along with controlled polymerization conditions, can impart enhanced smoothness. The control of the polymerization process will be described in detail later, briefly however, it involves the use of mixtures of photoinitiators which possess different absorbance characteristics such that longer wavelength radiation can be used to excite a photoinitiator or photoinitiators of the mixture, while shorter wavelength radiation is used to excite the other photoinitiators of the mixture. In this manner, the order of excitation is important. It is desirable that the longer wavelength photoinitiators are excited first, as this allows for improved adhesion and traps the filler components in place. The shorter wavelengths photoinitiators are then excited to complete the polymerization process. If this order of excitation is not used the filler compounds can aggregate and thereby create a matted finish. Thus, former procedure can improve visual appearance and acceptability by to enhancing the surface smoothness, or enhancing the surface shine, or enhancing the surface smoothness and surface shine. However, if a matted appearance is desired the latter procedure may be used.

A further object is to equal or exceed previous performance of parts as to corrosion resistance. There are a variety of corrosion resistance requirements which an effective coating must fulfill. The corrosion resistance testing evaluations include; salt spray, scab, and cycle corrosion evaluations and any associated creepback. The testing method for evaluating salt spray corrosion involve mounting the test panels in a temperature-controlled chamber, and then spraying the test panel with an aqueous solution of salt or salt mixtures in the form of a fine aerosol. Typically, the solution is a 5% salt (sodium chloride) solution, although the methods can vary according to chamber temperature and the composition of the salt solution. The test panels are inserted into the chamber and the salt solution is sprayed as a very fine fog mist over the samples at a constant temperature. Since the spray is continual, the samples are constantly wet, and thus, constantly subject to corrosion. The samples are rotated frequently to ensure uniform exposure to the salt spray mist. Test duration can be from 24 to 480 hours, or longer. Enhanced corrosion resistance, may be evidenced by exposure of a test panel for at least 400 hours without developing any significant evidence of under-film corrosion, such as blistering or other changes in appearance which may result from pin holes in the coating. In addition, the maximum allowable creepback is 2-4 mm along with at least less than 10% of the surface being corroded within 2-4 mm of sharp edges. A more rigorous test involves exposure for at least 900 hours without developing any significant evidence of under-film corrosion, such as blistering or other changes in appearance, with the maximum allowable creepback being 2-4 mm and at least less than 10% of the surface being corroded within 2-4 mm of sharp edges. The UV curable, corrosion resistant coating described herein meets and exceeds the requirements for at least one of these tests, in some instances more than one of these tests, and in other instances all these tests.

Scab corrosion testing involves the use of the salt spray procedure however the test panel is scribed such that a scratch is created in the coating. Scab-like corrosion then occurs along the scratch in a coating and manifests itself as a blister like appearance emanating away from the scratch. Enhanced corrosion resistance for scab corrosion may be demonstrated in that after 1 week the test panel exhibits no blistering or surface corrosion, or other change in appearance, with is a maximum creepback of up to 2 mm, and at least less than 10% of the surface is corroded within 3 mm of sharp edges. A more rigorous test involves exposure of a scribed test panel for up to 2 weeks without showing evidence of scab corrosion The UV curable, corrosion resistant coating described herein meets and exceeds the requirements for at least one of these tests, in some instances more than one of these tests, and in other instances all these tests.

Evaluation of coated surfaces using procedures that involve continual exposure to moisture (as occurs in the salt spray test) may not emulate realistic conditions experienced by the coated surface, which in reality will experience periods of wet and dry environments. Therefore evaluation of a coating using wet/dry cycles, with and without salt spray during the wet cycle, is a more realistic evaluation for daily use of a coating, particularly coatings used in the automotive industry. The continual wetness during the salt spray test does not allow this passive oxide layer to develop. The UV curable, corrosion resistant coating described herein meets and exceeds the requirements for at least one of these tests, in some instances more than one of these tests, and in other instances all these tests.

Along with corrosion testing, a coating undergoes a number of other evaluation criteria, including, tape adhesion/peel back test with and without humidity, resistance to chipping evaluation, thermal shock testing, and in the case of coatings for the automotive industry, resistance to exposure to automotive fluids. The UV curable, corrosion resistant coating described herein meets and exceeds the requirements for at least one of these tests, in some instances more than one of these tests, and in other instances all these tests.

The tape adhesion/peel back test is exactly how it sounds. The coated surface has cellophane tape applied to it and the tape is cross-scored to ensure efficient adhesion of the tape to the coated surface. The tape is then removed to test the adhesive properties of the coating to the surface, with a minimum of 99% paint retention expected. The UV curable, corrosion resistant coating described herein may meet or exceed this requirement.

Incorporation of humidity to the tape adhesion/peel back test determines how the adhesive properties of the coating behave under conditions in which corrosion may occur. The UV curable, corrosion resistant coating described herein may meet or exceeds the requirement for this test, wherein after 96 hours there is a minimum of 99% paint retention, and no blistering or other change in appearance is observed.

Resistance to chipping testing is primarily used to simulate the effects of the impact of flying debris on the coating of a surface. In particular, the test is used to simulate the effects of the impact of flying gravel or other debris on automotive parts. Typically a Gravelometer, which has been designed to evaluate the resistance of surface coatings (paint, clear coats, metallic plating, etc.) to chipping caused by the impacts of gravel or other flying objects. In general, the test sample is mounted in the back of the Gravelometer, and air pressure is used to hurl approximately 300 pieces of gravel, hexagonal metal nuts, or other angled objects at the test panel. The test sample is then removed, gently wiped with a clean cloth, and then tape is applied to the entire tested surface. Removal of the tape then pulls off any loose fragments of the coating. The appearance of the tested sample is then compared to standards to determine the chipping ratings, or visual examination can also be used. Chipping ratings consist of a number which designates the number of chips observed. The UV curable, corrosion resistant coating described herein may meet or exceed the requirement for the chip resistance test with a rating of 6-7.

A "cure" test is used to evaluate completeness of curing, the coating adhesion strength to the surface, and solvent resistance. The procedure used is to take a test panel, coat it with the test sample and then cure according using the cure method of choice, such as actinic radiation or in an oven. The coated and cured test panel is the subject to rubbing to evaluate the number of rubs needed to expose primer, or to expose the surface if primer is not used. Failure normally is determined by a breakthrough to the substrate surface. Generally, the cloth used to rub the surface is also soaked in an organic solvent such as methyl ethyl ketone (MEK) as a means to accelerate testing conditions and test for stability to solvent exposure. One rub is considered to be one back and forth cycle, and highly solvent resistant coating achieve a rating of more than 100 double rubs. In addition, a secondary reading may also be obtained by determining at what point a marring of the surface occurs. The UV curable, corrosion resistant coating described herein may meet or exceed the 100 double rubs requirement with a possible secondary rating of 0 or 1.

For evaluation of the heat resistance of a coating, a coated test panel is placed in an oven and evaluated for loss of adhesion, cracking, crazing, fading, hazing, or fogging after various periods of thermal exposure. The types of ovens used include, but are not limited to, convection ovens. The UV curable, corrosion resistant coating described herein may meet or exceed requirements for heat resistance with no loss of adhesion and no cracking, crazing, fading, hazing, or fogging after least 1 hour held at, at least 210° C., and at least 10 hrs held at, at least 210° C.

Thermal shock testing is the most strenuous temperature test, designed to show how the product will perform as it expands and contracts under extreme conditions. Thermal shock testing creates an environment that will show in a short period of time how a coating would behave under adverse conditions throughout years of change. Several variants of testing include the resiliency of a coating to rapidly changing temperatures, such as that experienced in winter when moving from a warm environment, such as a house, garage or warehouse, into the freezing, cold environment outside, or vice versa. Such thermal shock tests have a rapid thermal ramp rate (30° C. per minute) and can be either air-to-air or liquid-to-liquid shock tests. Thermal Shock Testing is at the more severe end on the scale of temperature tests and is used for testing coatings, packaging, aircraft parts, military hardware or electronics destined to rugged duty. Most test items undergo air-to-air thermal shock testing where the test product moves from one extreme atmospheric temperature to another via mechanical means. Fully enclosed thermal shock test chambers can be used to avoid unintended exposure to ambient temperature, whereby minimizing the thermal shock. In Thermal Shock testing the cold zone of the chamber can be maintained at −54° C. (−65° F.) and the hot zone can be set for 160° C. (320° F.). The test panels is held at each stage for at least an hour and then moved back and forth between stages in a large number of cycles. The number of Thermal Shock cycles can vary from 10 or 20 cycles, up to 1500 cycles. The UV curable, corrosion resistant coating described herein may meet and exceed the Thermal Shock testing requirement in which no loss of adhesion, cracking, crazing, fading, hazing, or fogging is observed for up to 20 cycles.

In the case of coatings used in the automotive industry, the resistance to motor vehicle liquids such as engine oil, transmission oil (manual and automatic), power steering fluid, engine coolant, brake fluid, window washer fluid, gasoline (containing MTBE or ethanol), ethanolic fuel, methanol fuel, diesel, and biodiesel, is critical, as it is very likely the coated surface will come into contact with any of these fluids throughout the lifetime of the motor vehicle. The test for resistance to motor vehicle liquids is an immersion test which involves dipping the coated test panel into a bath containing the motor vehicle liquids of interest. In addition, the bath is maintained at various temperatures depending on the specific requirements used for evaluation. After removing the test panel a thumbnail under pressure is dragged across the surface. The UV curable, corrosion resistant coating described herein may meets or exceed the presence of any visible defects, such as color change or paint removal to underlying surfaces, or lifting or peeling of paint film, for the liquids listed above. In particular, the UV curable, corrosion resistant coating described herein may meet and exceed immersion in engine oil for, at least 20 hours at 120° C., at least 24 hours at 150° C., at least 400 hours at 140° C., and at least 500 hours at 150° C.

For immersion in manual transmission oil the UV curable, corrosion resistant coating described herein may remain intact after at least 8 hours at 60° C., or after at least 8 hours at 90° C., or after at least 20 hours at 90° C., or after at least 24 hours at 90° C.; while in automatic transmission fluid it may remain intact after at least 8 hours at 60° C., or after at least 8 hours at 70° C., or after at least 20 hours at 70° C., or after at least 24 hours at temperatures from 70° C.

In power steering fluid and engine coolant the UV curable, corrosion resistant coating described herein may remain intact after at least 8 hours at 60° C., or after at least 8 hours at 70° C., or after at least 20 hours at 60° C., or after at least 24 hours at 70° C.

In addition, upon immersion in brake fluid, window washer fluid, gasoline (containing MTBE or ethanol) ethanolic fuel, and methanol fuels, the UV curable, corrosion resistant coating described herein may remain intact after at least 4 hours at 23° C., or after at least 6 hours at 23° C., or after at least 8 hours at 23° C.

Upon immersion, in diesel and biodiesel, the UV curable, corrosion resistant coating described herein may remain intact after at least 8 hours at 23° C., or after at least 20 hours at 23° C., or up to 24 hours at 23° C.

In addition, spot testing for blistering of the UV curable, corrosion resistant coating described herein by contact with corrosive solutions at elevated temperature, such as, by way of example only, 10% sulfuric acid at 65° C., demonstrated the coating shows no marking after at least 6 minutes, in other embodiments, no markings after at least 12 minutes, in other embodiments, no markings after at least 24 minutes, and yet in other embodiments, no markings after at least 60 minutes.

Another object of the invention is to produce opaque, corrosion resistant coatings which may be applied to metals in one coat. It is evident that there is considerable benefit to having a coating composition and process which requires only a single coating step. This is cost effective in terms of the amount of coating composition used, as well as with the overall production time per item coated. Clearly, the more a part needs to be handled prior to becoming a finished product, the more costly it is to produce and therefore, the lower the earnings margins are. Thus, there exists the need for a coating composition which can be applied in a single coating step. Obviously, the coating composition must still impart beneficial qualities, such as corrosion resistance, when applied as a single coat. The UV curable coating composition utilizes fillers in the mixture of oligomers, monomers, polymerizable pigment dispersion, and photoinitiators to impart desirable rheological characteristics to the resulting film that is applied to the surface prior to exposure to UV radiation. These rheological properties include viscosity and thixotropic behavior, which allows the composition to be sprayed onto a surface, but also allows the film to flow and fill in any gaps without dripping or running off the surface. Such control of the rheological properties of the UV curable coating composition contributes to the ability of the coating procedure to occur in a single step.

The term "cure," as used herein, refers to polymerization, at least in part, of a coating composition.

The term "curable," as used herein, refers to a coating composition which is able to polymerize at least in part.

The term "irradiating," as used herein, refers to exposing a surface to actinic radiation.

The term "co-photoinitiator," as used herein, refers to a photoinitiator which may be combined with another photoinitiator or photoinitiators.

The term "polymerizable pigment dispersions," as used herein, refers to pigments attached to polymerizable resins which are dispersed in a coating composition.

The term "polymerizable resin" or activated resin," as used herein, refers to resins which possess reactive functional groups.

The term "pigment" as used herein, refers to compounds which are insoluble or partially soluble, and are used to impart color.

Still yet another object of the invention is to produce a product applicable by HVLP or electrostatic bell without the use of any heating apparatus. The UV curable coating composition can be applied to surfaces by spraying, curtain coating, dipping, rolling or brushing. However, spraying is the one of the most efficient methods of application, and this can be accomplished using High Volume Low Pressure (HVLP) methodology or electrostatic spraying technology. Note that HVLP and electrostatic spraying techniques are methods well established in the coating industry, thus it is adventitious to develop coating compositions which utilize them as an application means. In addition, because the coating composition is UV curable there is no need for any heating apparatus to assist in curing. A significant benefit to curing without requiring any heating apparatus is that thermally sensitive objects can be coated and UV cured without causing thermal damage. For instance metal objects with incorporated thermally sensitive plastic or rubber components are difficult to heat cure due to potential damage to the plastic or rubber. However, coating and UV curing the UV curable composition eliminates this problem. In addition, virtually any thermally sensitive object can be coated using the UV curable coating composition approach described herein.

It is very important to the durability of a motor vehicle that corrosion of underhood components be prevented. In addition, for the desirability of a vehicle, components should have an attractive appearance. Thus it is important that underhood parts be coated with a corrosion preventative, visually acceptable, opaque coating. In addition, the coating should be as environmentally friendly as possible, for the welfare of both the business and the general population. Previously, coatings used for this purpose have been either powders or waterborne liquids. Powder coatings require a large amount of time, energy, and space to be properly cured. Waterbornes often have similar requirements and also show inferior performance. A corrosion resistant UV cured, opaque coating equals or exceeds the performance of powders or waterbornes for underhood use, while cutting production time and space requirements as well as up to 80% less energy.

Sprayable UV curable finishing compositions were described by Andrew Sokol in U.S. Pat. No. 5,453,451. These coatings, while intended to reduce emissions, were not formulated to prevent corrosion or produce a one coat finish. Some photoinitiators, co-initiators as well as the fillers necessary to achieve a sprayable, opaque, one coat finish of suitable viscosity were not included. Solid pigment dispersions were not used. Solid pigment dispersions are described U.S. Pat. No. 4,234,466. While color matching panels, cured by UV light, were described, the intended usage was for the coloring of plastic and powdery paints. As illustrated in the online edition of Industrial Paint and Powder Magazine, "Faster, Friendlier, and Fewer Rejects" by Dennis Kaminski, posted Apr. 28, 2004, it has been accepted wisdom that pigmented UV coatings are high viscosity, requiring heated recycling. Raw pigments are difficult to disperse in these high viscosity coatings and have required milling. Pigment dispersions in solvents have been used, but they added to emissions. Pigment dispersions in reactive diluents have been used, but have been difficult to use in quantities sufficient to provide sufficient pigmentation for coverage in one coat.

Prior to this composition, if one wished to apply a corrosion resistant coating to metal, one had several choices. One could have used a conventional solventborne coating, resulting in increased emissions. One could have used a waterborne coating, resulting in higher production time and/or higher energy and space requirements as well as possible flash-rusting. One could have used powder, with increased use of space and energy as well as an orange-peel appearance. Less common alternatives were e-coats, which required considerable space and energy and finally electron beam curing, which required high energy and extensive safety shielding. One could also have used existing UV curable coatings which would have required heating and special spray equipment. An additional problem with such UV curable coatings is increased energy usage through heat. Such heating and/or temperature cycling may cause breakdown in some UV curable components, especially epoxy acrylates. Heat may also cause unwanted polymerization due to inhibitor loss. In addition, UV curable pigmented coatings may require milling, and thus increased production time. Further, color control is not always precise and stable. Use of this composition reduces emissions, reduces space and production time requirements, and reduces energy usage as compared to previous technologies. This composition's use also improves color control and reproducibility. In addition, no heat is used, so breakdown and undesirable polymerization are not a concern.

Described herein are improved sprayable, 100% solids compositions, methods of using the compositions for coating surfaces, and the processes of coating surfaces. More particularly, described herein are compositions which are comprised of actinic radiation curable material, photoinitiators, fillers, slip and flow enhancers, and polymerizable pigment dispersions, and which may be applied in a single coat by conventional High Volume Low Pressure (HVLP) or electrostatic bell, with no additional heat.

The present invention provides sprayable, ultraviolet light curable, 100% solids compositions of matter comprising UV curable material, photoinitiators, and solid pigment polymerizable dispersions for applying to metal substrates, to produce an opaque coating. The compositions are especially advantageous in that they produce opaque, corrosion resistant, UV curable coatings without the use of milling and with no addition of vehicle (i.e. the use of a solvent). The characteristics of the compositions are that they have zero VOC's, zero HAP's, cure in seconds, for example, but not limited to, 1.5 seconds, (thereby decreasing cure time by 99%), require 80% less floor space, require 80% less energy, are non-flammable, require no thinning, are extremely durable, are high gloss, applied using HVLP or electrostatic bell, do not require flash off ovens, do not require thermal cure, have no thermal stress and no orange peel effect. Further, they enable the user to decrease production time while producing a product with superior, more reproducible appearance. The user stands to save time, energy, and space. In addition, the user may reduce or eliminate emissions as no solvent or vehicles are used.

The present invention also provides processes for applying sprayable, ultraviolet light curable, 100% solids. The characteristics of the processes are that they provide an industrial strength coating, tested to meet OEM standards, have 98% reclamation of overspray, no cooling line required, immediate "pack and ship", decreased parts in process, less workholders, no workholder burn off, eliminate air pollution control systems, safer for the environment, safer for employees, decreased production costs, decreased production time, and increased production.

The compositions of the invention are essentially solvent free, and is therefore referred to as a solids composition. The compositions of the invention, based on total composition weight generally comprise from 0-40% percent by weight oligomer, 5-68% by weight monomer or mixture of monomers, 3-15% solid pigment dispersion or mixture of solid dispersions, 0.5-11% filler or mixture of fillers, and 3-15% photoinitiator or mixture of photoinitiators and co-initiators, which initiate polymerization when exposed to UV light. The compositions also comprise up to about 2% of a corrosion inhibitor, and up to about 2% of a slip and flow enhancer.

The oligomer may be selected from the group consisting of monoacrylates, diacrylates, triacrylates, polyacrylates, urethane acrylates, polyester acrylates; including mixtures thereof. Suitable compounds which may be used in the practice of the present invention include, but are not limited to, trimethylolpropane triacrylate, alkoxylated trimethylolpropane triacrylate, such as ethoxylated or propoxylated trimethyolpropane triacrylate, 1,6-hexane diol diacrylate, isobornyl acrylate, aliphatic urethane acrylates, vinyl acrylates, epoxy acrylates, ethoxylated bisphenol A diacrylates, trifunctional acrylic ester, unsaturated cyclic diones, polyester diacrylates; and mixtures thereof.

Preferably, the oligomer is selected from a group consisting of epoxy acrylates, epoxy diacrylate/monomer blends and aliphatic urethane triacrylate/monomer blends. Even further preferred, the oligomer is selected from the group consisting of fatty acid modified bisphenol A acrylates, bisphenol epoxy acrylates blended with trimethylolpropane triacrylate, and aliphatic urethane triacrylates blended with 1,6-hexanediol acrylate.

The monomers are selected from a group comprising trimethylolpropane triacrylate; adhesion promoters such as, but not limited to, 2-phenoxyethyl acrylate, isobornyl acrylate, acrylate ester derivatives, and methacrylate ester derivatives; and cross-linking agents, such as, but not limited to, propoxylated glyceryl triacrylate.

The rapid polymerization reaction is initiated by a photoinitiator component of the composition when exposed to ultraviolet light. The photoinitiators used in the composition of the present invention are categorized as free radicals; however, other photoinitiator types can be used. Furthermore, combinations of photoinitiators may be used which encompass different spectral properties of the UV sources used to initiate polymerization. In one embodiment, the photoinitiators are matched to the spectral properties of the UV sources. It is to be appreciated that the present invention may be cured by medium pressure mercury arc lights which produce intense UV-C (200-280 nm) radiation, or by doped mercury discharge lamps which produce UV-A (315-400 nm) radiation, or UV-B (280-315 nm) radiation depending on the dopant, or by combination of lamp types depending on the photoinitiator combinations used. In addition, the presence of pigments can absorb radiation both in the UV and visible light regions, thereby reducing the effectiveness of some types of photoinitator. However, phosphine oxide type photoinitiators, for example but not limited to bis acylphosphine oxide, are effective in pigmented, including, by way of example only, black, UV curable coating materials. Phosphine oxides also find use as photoinitiators for white coatings.

Photoinitiators which are suitable for use in the practice of the present invention include, but are not limited to, 1-phenyl-2-hydroxy-2-methyl-1-propanone, oligo {2-hydroxy-2 methyl-1-4-(methylvinyl)phenylpropanone)}, 2-hydroxy 2-methyl-1-phenyl propan-1 one, bis (2,6-dimethoxybenzoyl)-2,4,4-trimethylpentyl phosphine oxide, 1-hydroxycyclohexyl phenyl ketone and benzophenone as well as mixtures thereof.

Other useful initiators include, for example, bis(n,5,2,4-cyclopentadien -1-yl)-bis 2,6-difluoro-3-(1H-pyrol-1-yl) phenyl titanium and 2-benzyl -2-N,N-dimethyl amino -1-(4-morpholinophenyl)-1-butanone. These compounds are IRGACURE® 784 and IRGACURE® 369, respectively (both from Ciba Specialty Chemicals 540 White Plains Road, Tarrytown, N.Y., U.S.A.)

Still other useful photoiniators include, for example, 2-methyle -1-4(methylthio)-2-morpholinopropan-1-one, 4-(2-hydroxy) phenyl -2-hydroxy-2-(methylpropyl)ketone, 1-hydroxy cyclohexyl phenyl ketone benzophenone, (n-5,2,4-cyclopentadien -1-yl)>1,2,3,4,5,6-n)-(1-methylethyl) benzene-iron(+) hexafluorophosphate (−1), 2,2-dimethoxy-2-phenyl-1-acetophen-one 2,4,6-trimethyl benzoyl-diphenyl phosphine oxide, benzoic acid, 4-(dimethyl amino)-ethyl ether, as well as mixtures thereof.

Preferably, the photoinitiators and co-photoinitiators are selected from a group consisting of phosphine oxide type photoinitiators, diphenyl (2,4,6-trimethylbenzoyl) phosphine oxide, benzophenone, 1-hydroxycyclohexyl phenyl ketone, 2-hydroxy-2-methyl-1-phenyl-propan-1-one (DAROCUR® 1173 from Ciba Specialty Chemicals 540 White Plains Road, Tarrytown, N.Y., U.S.A.)), 2,4,6,-trimethylbenzophenone, 4-methylbenzophenone, oligo (2-hydroxy-2-methyl-1-(4-(1-methylvinyl)phenyl)propanone), amine acrylates, thioxanthones, benzyl methyl ketal, and mixtures thereof.

More preferably, the photoinitiators and co-photoinitiators are 2-hydroxy-2-methyl-1-phenyl-propan-1-one (DAROCUR® 1173 from Ciba Specialty Chemicals 540 White Plains Road, Tarrytown, N.Y., U.S.A.), phosphine oxide type photoinitiators, IRGACURE® 500 (Ciba Specialty Chemicals 540 White Plains Road, Tarrytown, N.Y., U.S.A.), amine acrylates, thioxanthones, benzyl methyl ketal, and mixtures thereof. In addition, thioxanthone is used as a curing booster. The term "curing booster", as used herein, refers to an agent or agents which boost or other wise enhance, or partially enhance, the curing process.

Pigments, are insoluble white, black, or colored material, typically suspended in a vehicle for use in a paint or ink, and may also include effect pigments such as micas, metallic pigments such as aluminum, and opalescent pigments.

Pigments are used in coatings to provide decorative and/or protective functions, however; due to their insolubility, pigments may be a possible contributing factor to a variety of problems in liquid coatings and/or dry paint films. Examples of some film defects thought to be attributable to pigments include: undesirable gloss due to aggregates, blooming, pigment fading, pigment flocculation and/or settlement, separation of pigment mixtures, brittleness, moisture susceptibility, fungal growth susceptibility, and/or thermal instability.

An ideal dispersion consists of a homogeneous suspension of primary particles. However, inorganic pigments are often incompatible with the resin in which they are incorporated, and this generally results in the failure of the pigment to uniformly disperse. Furthermore, a milling step may be required as dry pigments comprise a mixture of primary particles, aggregates, and agglomerates which must be wetted and de-aggregated before the production of a stable, pigment dispersion is obtained.

The level of dispersion in a particular pigment containing coating composition affects the application properties of the composition as well as the optical properties of the cured film. Improvements in dispersion have been shown to result in improvements in gloss, color strength, brightness, and gloss retention.

Treatment of the pigment surface to incorporate reactive functionality has improved pigment dispersion. Examples of surface modifiers include polymers such as polystyrene, polypropylene, polyesters, styrene-methacrylic acid type copolymers, styrene-acrylic acid type copolymers, polytetrafluoroethylene, polychlorotrifluoroethylene, polyethylene-tetrafluoroethylene type copolymers, polyaspartic acid, polyglutamic acid, and polyglutamic acid-.gamma.-methyl esters; and modifiers such as silane coupling agents and alcohols.

These surface modified pigments have improved the pigment dispersion in a variety of resins, for example, olefins such as polyethylene, polypropylene, polybutadiene, and the like; vinyls such as polyvinylchloride, polyvinylesters, polystyrene; acrylic homopolymers and copolymers; phenolics; amino resins; alkyds, epoxys, siloxanes, nylons, polyurethanes, phenoxys, polycarbonates, polysulfones, polyesters (optionally chlorinated), polyethers, acetals, polyimides, and polyoxyethylenes.

Various organic pigments can be used in the present invention including, for example, carbon black, azo-pigment, phthalocyanine pigment, thioindigo pigment, anthraquinone pigment, flavanthrone pigment, indanthrene pigment, anthrapyridine pigment, pyranthrone pigment, perylene pigment, perynone pigment and quinacridone pigment.

In addition, various inorganic pigments can be used, for example, but not limited to, titanium dioxide, aluminum oxide, zinc oxide, zirconium oxide, iron oxides: red oxide, yellow oxide and black oxide, Ultramarine blue, Prussian blue, chromium oxide and chromium hydroxide, barium sulfate, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, clays such as kaolin clay, muscovite and sericite.

Inorganic pigments, as used herein, refers to ingredients which are particulate and substantially nonvolatile in use, and includes those ingredients typically labeled as inerts, extenders, fillers or the like in the paint and plastic trade.

Inorganic pigments for the present invention advantageously are opacifying inorganic pigments, such as pigmentary titanium dioxide. Titanium dioxide pigments include rutile and anatase titanium. Treated inorganic pigments, and especially pigmentary titanium dioxide, find uses in powder paints and similar systems.

Preferably, the solid pigment dispersions used in the composition of the invention are selected from a group consisting of the following pigments bonded with modified acrylic resins carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red. These polymerizable pigment dispersions are distinguishable for other pigment dispersions which disperse insoluble pigment particles in some type of resin and entrap the pigment particles within a polymerized matrix. The pigment dispersions use in the composition of the invention have pigments treated such that they are attached to acrylic resins; consequently the pigment dispersion is polymerizable upon exposure to UV irradiation and becomes intricately involved in the overall coating properties.

The term "corrosion inhibitor", as used herein, refers to an agent or agents which inhibit, or partially inhibit corrosion. Corrosion inhibitors are formulated into coatings to minimize corrosion of the substrate to which it is applied. Suitable corrosion inhibitors can be selected from organic pigments, inorganic pigments, organometallic pigments or other organic compounds which are insoluble in the aqueous phase. It is also possible to use concomitantly anti-corrosion pigments, for example pigments containing phosphates or borates, metal pigments and metal oxide pigments, for example but not limited to zinc phosphates, zinc borates, silicic acid or silicates, for example calcium or strontium silicates, and also organic pigments corrosion inhibitor based on aminoanthraquinone. In addition inorganic corrosion inhibitors, for example salts of nitroisophthalic acid, tannin, phosphoric esters, substituted benzotriazoles or substituted phenols, can be used. Furthermore, sparingly water-soluble titanium or zirconium complexes of carboxylic acids and resin bound ketocarboxylic acids are particularly suitable as corrosion inhibitors in coating compositions for protecting metallic surfaces. In addition, the "key" embodiment is an all-solids, non-metal corrosion inhibitor, including by way of example only, Cortec Corporation's (4119 White Bear Parkway, St. Paul, Minn., U.S.A.), M-235 product, and any other upgrades and superseding products.

The term "filler" refers to a relatively inert substance, added to modify the physical, mechanical, thermal, or electrical properties of a coating. In addition fillers are used to reduce costs.

The particle size of fillers can vary from micron sized particles to nanometer sized particles. Polymer nanocomposites are the blend of nanometer-sized fillers with either a thermoset or UV curable polymers. Polymer nanocomposites have improved properties compared to conventional filler materials. These improved properties range include improved tensile strength, modulus, heat distortion temperature, barrier properties, UV resistance, and conductivity.

The fillers used in the composition of the invention are selected from a group consisting of amorphous silicon dioxide prepared with polyethylene wax, synthetic amorphous silica with organic surface treatment, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof.

The term "flow and slip enhancer", as used herein, refers to an agent or agents which enhance or partially enhance the flow and slip characteristics of a coating. To provide good substrate wetting and slip with no migration properties to the coated surface it is desirable to incorporate some type of flow and slip enhancer (also referred herein as slip and flow enhancer) into the composition. Slip and flow enhancing agents are additives which reduce the friction coefficient and surface tension, thereby facilitating spreading and improving of slip characteristics of coating films. Examples of slip and flow enhancing agents are, but not limited to, various waxes, silicones, modified polyesters, acrylated silicone, molybdenum disulfide, tungsten disulfide, EBECRYL® 350 (UCB Surface Specialties, Brussels, Belgium), EBECRYL® 1360 (UCB Surface Specialties, Brussels, Belgium), and CN990 (Sartomer, Exton, Pa., U.S.A.), polytetrafluoroethylene, a combination of polyethylene wax and polytetrafluoroethylene, dispersion of low molecular weight polyethylene or polymeric wax, silicone oils, and the like.

Possible methods of applying the composition of the invention include spraying, brushing, curtain coating, dipping, and rolling. To enable spraying onto a desired surface the prepolymerization viscosity must be controlled. This is achieved by the use of low molecular weight monomers which take the place of organic solvents. However, these monomers also participate and contribute to final coating properties and do not evaporate. The lack of solvent use with these coating compositions makes them inherently environmentally friendly. Furthermore, without the need to thermally cure, or drying stages with these coatings, there is no longer a need for large ovens, which decreases the space and energy commitment of the coating end-user.

The viscosity of the composition of the invention is from about 2 centipoise to about 1500 centipoise. Preferably, the composition of the invention wherein has a viscosity of approximately 500 centipoise or less at room temperature, allowing coverage in one coat with application by HVLP or electrostatic bell essentially without the addition of heat.

It is customary that metals to be coated. Desirable coatings prevent corrosion as well as producing an attractive appearance. Historically, metals have been coated primarily by solventborne paints, powder, or waterborne paints. More recently, ultraviolet curable coatings, especially clear hardcoats have been used. All of these technologies have their flaws. Solventborne paints often show superior performance, but produce undesirable emissions. They also require time, space and energy to cure. Use of powder may decrease emissions, but also requires considerable time, space, and energy to cure. Powder coatings also often display an "orange peel" appearance that may be undesirable. Waterborne paints may decrease emissions and energy usage. Waterbornes still require considerable space and time, especially if air drying is used. In addition they may promote flash-rusting and have other performance characteristics inferior to other technologies. The use of UV curing eliminates many emissions, saves space, and decreases both production time and energy usage. However, opaque UV curable coatings have not been available with the spraying characteristics and corrosion resistance that industry requires. Previously, 100% solids UV curable coatings have also shown poor wetting of pigments, causing an undesirable appearance.

6. 100% Solids, UV Curable Coating Composition Use

The composition of the present invention is a significant improvement as it does not contain any water or organic solvent which must be removed before complete curing is achieved. Therefore, the composition of the present invention is much less hazardous to the environment, and is economical because it requires less space, less energy and less time. In addition, the composition of the invention can be applied in as a single coat, and gives a corrosion resistant coating. Therefore, use of the composition of the invention to coat various products, such as automotive parts, decreases coating time and therefore increases production.

FIG. 1 is a schematic of the process used for coating objects with the UV curable coating composition. The first stage of the assemblage is an optional mounting station, in which the object to be coated is attached to a movable unit, by way of example only, a spindle, a hook, or a baseplate. The object can be attached using, by way of example only, nails, screws, bolts and nuts, tape, and glue. In addition, human workers can perform the task of attachment, or alternatively, robots can be used to do the same function. Next, the mounted object is translated by an optional means for moving to an Application Station. The optional means for moving can be achieved, by way of example only, conveyer belts, rails, tracks, chains, containers, bins, and carts. In addition, the means for moving can be mounted on a wall, or a floor, or a ceiling, any combination thereof. The Application Station is the location at which the desired object is coated with the necessary coating composition. The means for applying the coating composition is located at the Application Station. The means for applying the coating composition include, by way of example only, high pressure low volume spraying (HVLP) equipment, electrostatic spraying equipment, brushing, rolling, dipping, blade coating, curtain coating or a combination thereof. The multiple means for applying the coating composition can be incorporated and arranged at the Application Station whereby it is ensured that top, bottom and side coverage of the object occurs. In addition, the mounted object is optionally rotated, on at least one axis, prior to and during the application of the coating composition to ensure uniform coverage. When application of the coating composition is complete, the mounted coated object may continue to rotate, or may cease rotating. The Application Station may also include an optional reclamation system to reclaim any oversprayed coating composition, and whereby reclaim at least 98% of oversprayed coating composition. This composition recycling system allows for significant savings in the use and production of coating compositions, as the reclaimed composition can be applied to different objects in the process line. The mounted coated object may now be translated from the Application Station, by the optional means for moving, to the Irradiation Station (also referred to herein as a curing chamber), wherein curing of the coated object occurs. The Irradiation Station is located further along the production line at a separate location from the Application Station. In one embodiment the Irradiation Station has a means for limiting exposure of actinic radiation to other portions of the assemblage. Multiple means are envisioned, including, but not limited to, doors, curtains, shields, and tunnels which incorporate angular or curved paths along the production line. The means for limiting exposure of actinic radiation of the Irradiation Station are used, such as, by way of example only, either closing doors, placement of shields, or closing curtains, to protect operators form exposure to UV radiation, and to shield the Application Station to ensure that no curing occurs there. Inside the Irradiation Station there are three sets of UV lamps arranged to ensure top, bottom and side exposure to the UV radiation. In addition each UV lamp set contains two separate lamp types; by way of example only, one a mercury arc lamp and the other a mercury arc lamp doped with iron, to ensure proper three dimensional curing. Thus, there are actually six lamps with in the Irradiation Station. Alternatively, this three dimensional curing can be achieved by using only two lamps, by way of example only, one a mercury arc lamp and the other a mercury arc lamp doped with iron, with a mirror assembly arranged to ensure exposure to the UV radiation and curing of the top, bottom and sides of the coated object. Regardless of the specific approach used, location of the two lamp types within the Irradiation Station is adventitious as it does not require transport of the coated object to separate locations for partial curing and then complete curing.

In one embodiment, after translation of the mounted coated object inside the Irradiation Station, the doors close and the mounted coated object is again optionally rotated. The longer wavelength lamps, by way of example only, mercury arc lamp doped with iron, are activated for the partial curing stage, and then the sorter wavelength lamps, by way of example only, mercury arc lamp, are activated for the full cure stage. The longer wavelength lamps do not need to be completely off before the shorter wavelength lamps are turned on. Following the two curing stages, all lamps are turned off and rotation of the mounted coated and completely cured object is stopped, the doors on the other side of the Irradiation Station are opened and the fully cured mounted object is translated, using the optional means for moving, to an optional Removal Station. At the optional Removal Station coated, fully cured object may be removed from the mounting and, either moved to a storage facility, using the optional means for moving, or immediately packed and shipped. In addition, human workers can perform the task of removal, or alternatively, robots can be used to do the same function. No cooling is required prior to removal, as no heat is required for the application or curing steps, with all steps occurring at ambient temperature.

Figure 2:
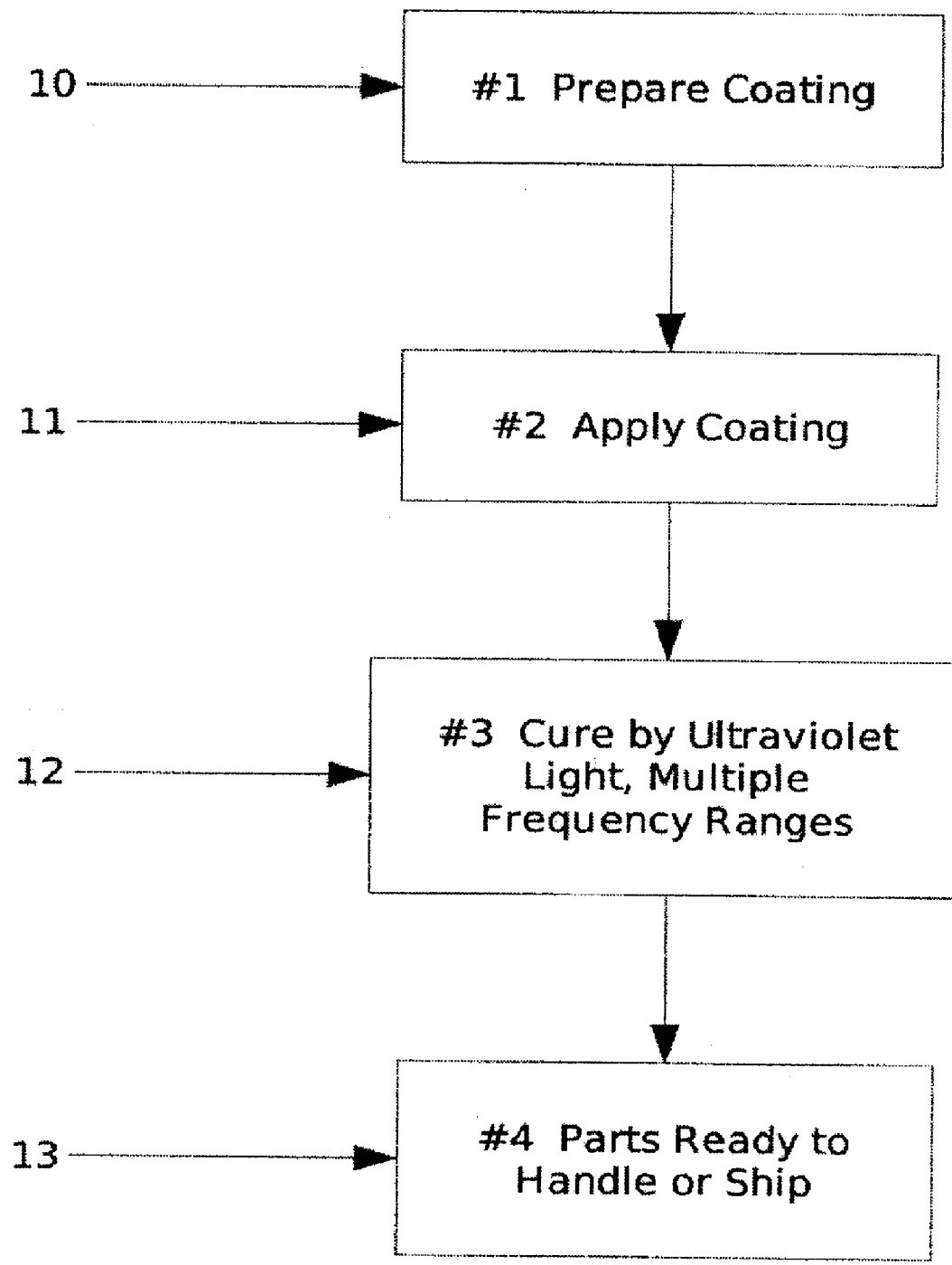
FIG. 2 is a flowchart of the operations that comprise the method.
Figure 3:
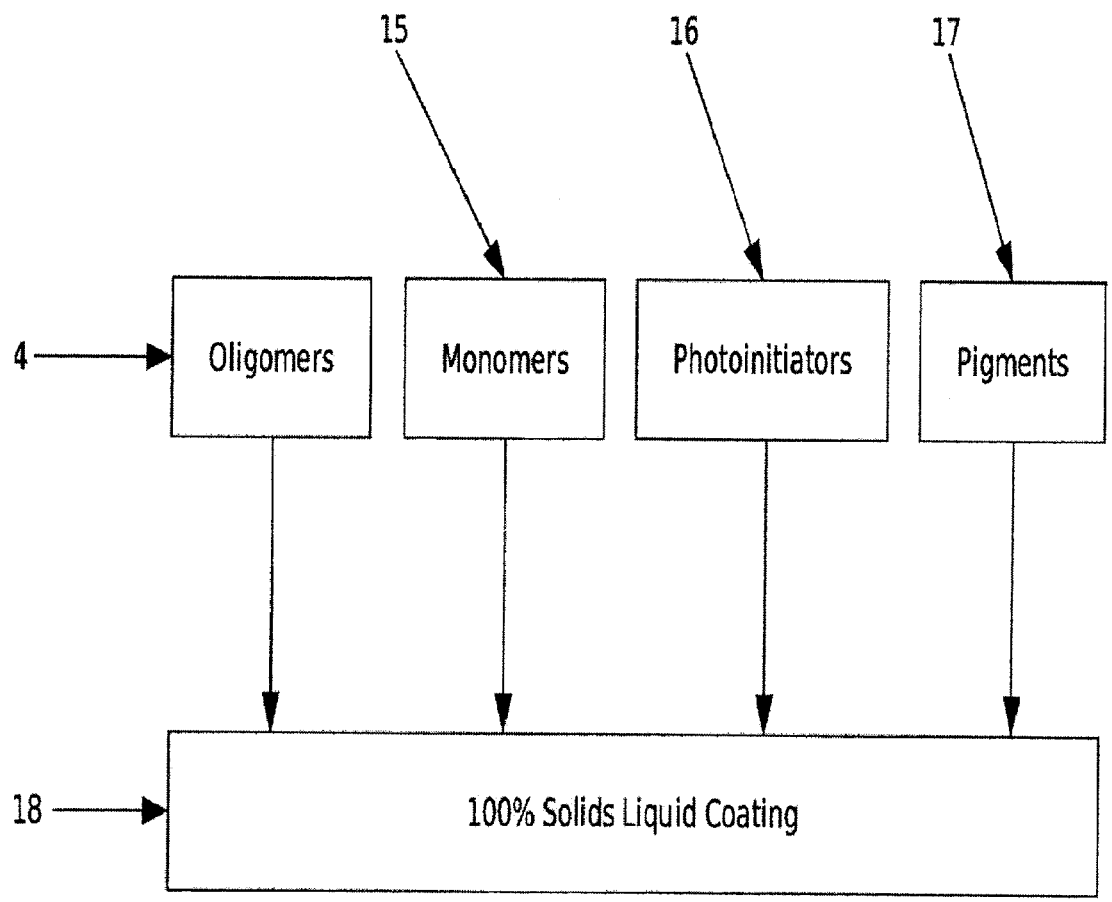
FIG. 3 depicts is an illustration of the components required for an opaque, corrosion resistant, UV curable coating.
Figure 4:
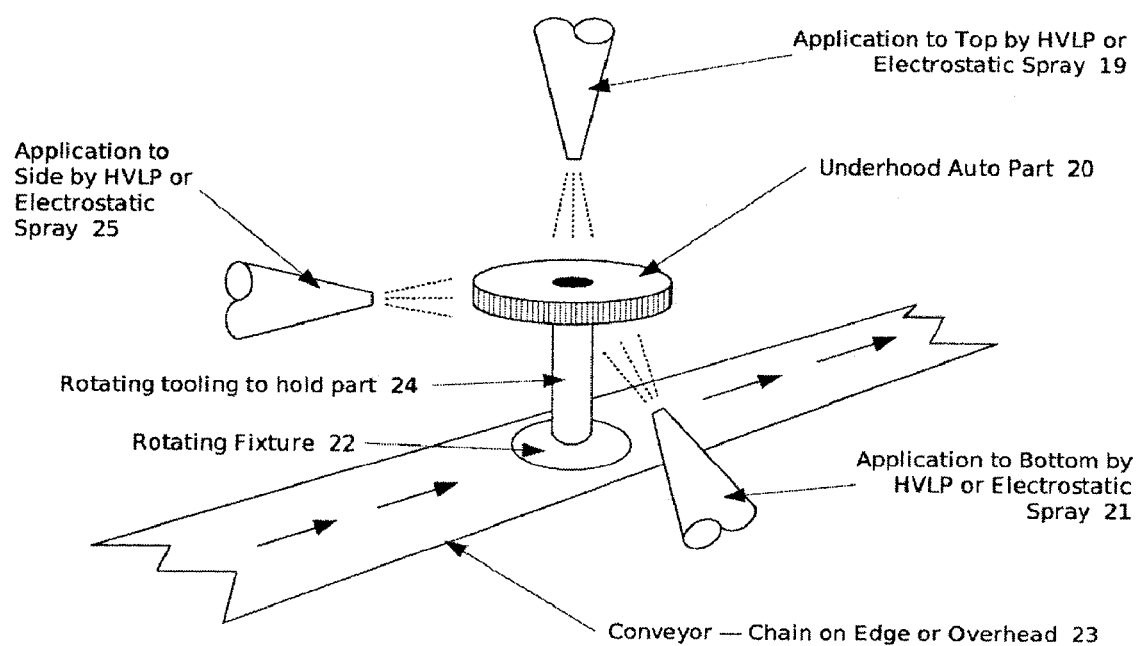
FIG. 4 is an illustrative of how the coating is applied.
Figure 5:
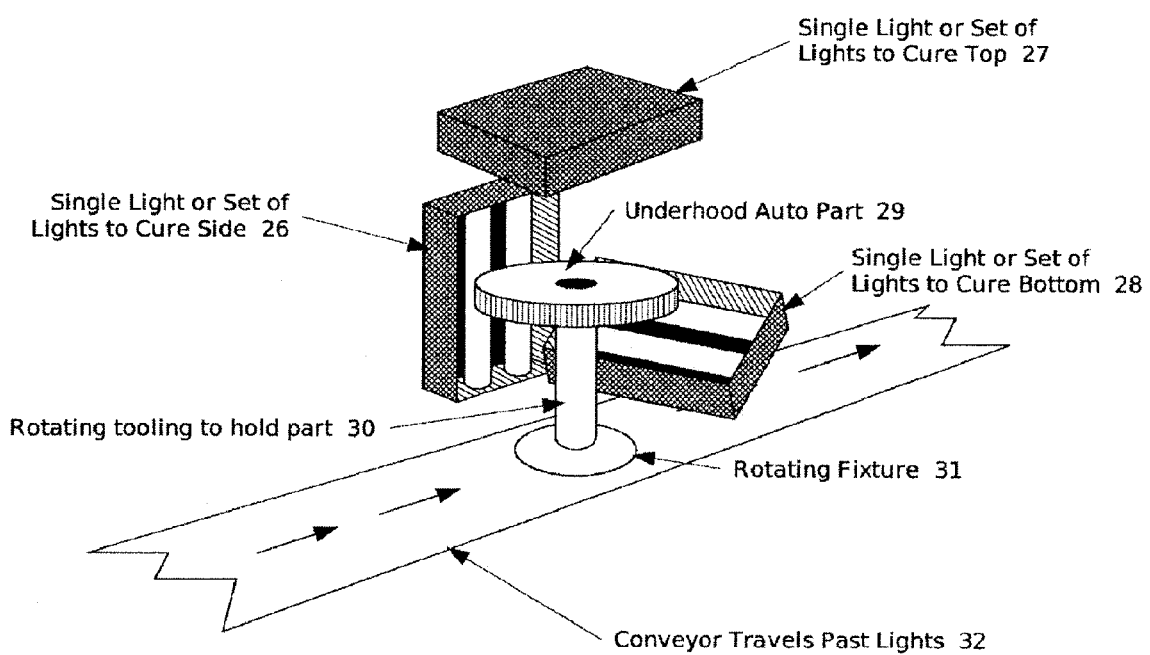
FIG. 5 is an illustration of the cure of the coating.
Figure 6:
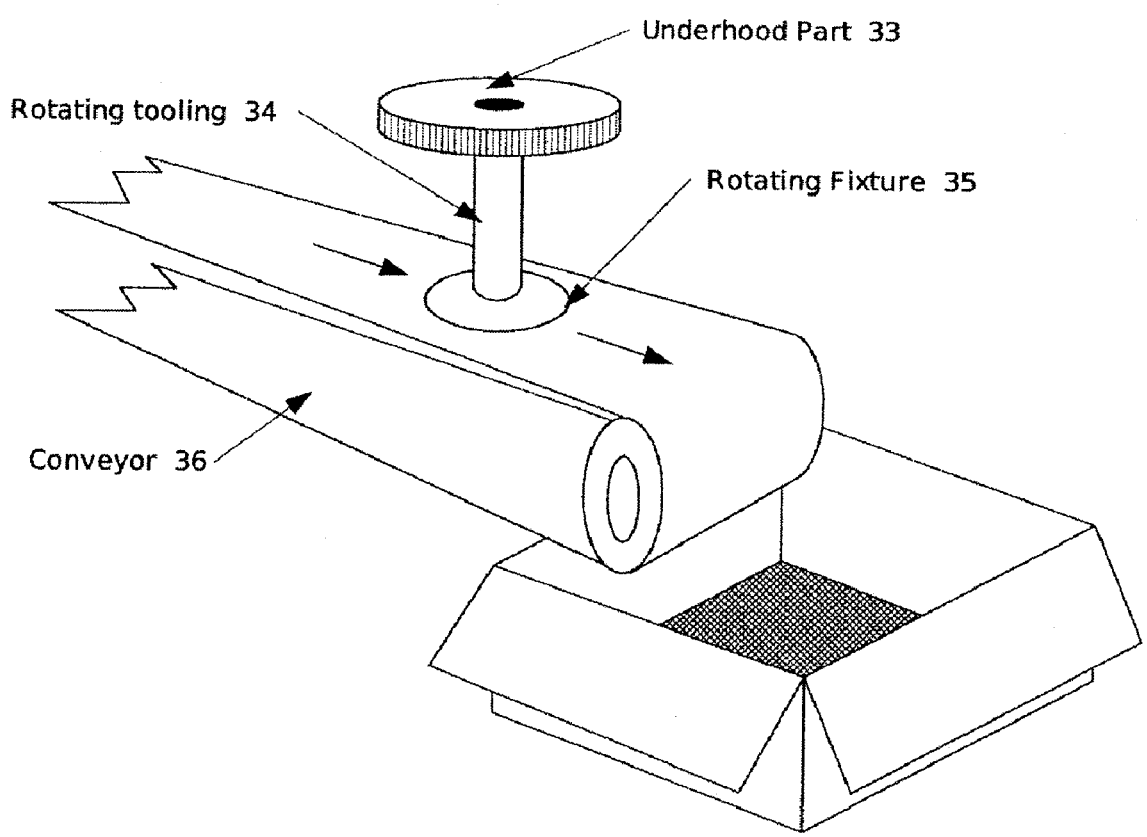
FIG. 6 is an illustration of the immediate availability of shipping and handling of underhood automobile parts.

FIG. 2 is a flow chart outlining a typical approach when using the composition of the invention. Initially, the composition is prepared to the desired specification regarding opacity, color, corrosion resistance, gloss, etc. Generally the components are mixed together using, by way of example only, a sawtooth blade or a helical mixer, until a smooth coating mixture is obtained. In addition, mixing can be achieved by shaking, stirring, rocking, or agitating. Next, this composition is applied to the desired surface using HVLP or electrostatic bell, and then cured by using either a single UV light source, or a combination of light sources which emit spectral frequencies that overlap the required wavelengths needed to excite the specific photoinitiators used in the composition. After curing is complete, the coated surface is ready for immediate handling and shipping. FIG. 3 depicts an illustration of the components required to create an opaque, corrosion resistant, UV curable coating. FIG. 4 shows the arrangement of spray heads used for coating, although other coating techniques can be used such as dipping, flow, or curtain coating. FIG. 5 indicates the UV lamp arrangement for complete three dimensional curing. Finally, FIG. 6 illustrate the beneficial ability for immediate "pack and ship", without the need to wait for parts to cool or for solvent emissions to dissipate.

This process can be applied, by way of example only, to the coating of underhood parts used in the automotive industry. Underhood parts generally refer to automotive parts which are not immediately visible, unless the vehicle is lifted, or the covering to the engine compartment (i.e. hood) is lifted or removed. Some examples, but not limited to, of underhood parts which can be coated with the composition of the invention using this process are oil filters, dampers, brake rotors, engine blocks, engine manifolds, alternator casings, and battery casings. Advantages for the use of these compositions and methods is that the coating does not ball up and come off of completely cured, coated objects, and in the case of dampers, one benefit of the increased adhesion is decreased squeakiness of the dampers.

Previous technology involves the application of conventional opaque, corrosion resistant coatings to provide a finish to underhood parts of motor vehicles. These coatings have, in the past been solventborne. More recently, in the interest of lower emissions, these coatings have been waterborne or powder. Referring to FIG. 4, numbers 19 through 25 are taken from previous technologies, such as HVLP or electrostatic sprayers (19, 21, and 25), conveyer systems (23), rotating part holders (22 and 24), and the part to be coated (20). All these technologies require long curing times and larger space. In addition, large amounts of energy are often required. A system for destruction of volatile solvents involved in curing may also be required. With powder, a system for collection of particulates may be required. A 100% solids UV curable coating is one that contains no added solvents or water which would require evaporation or to be driven off by heat. As a result, there are no emissions from solvent. No space is required for large ovens. No time is required for evaporation or baking. Energy use is up to 80% lower, because heating is unnecessary. With this process, emissions can be lower still, while saving space, time and energy and requiring no final system for pollution control. Furthermore, the process of the invention has the ability to reclaim any oversprayed, uncured solids.

It has been assumed that opaque coatings could not be well enough cured by UV radiation to fully penetrate to the base substrate and to meet the quality demands of the automotive industry. By combination of a properly formulated 100% solids UV curable coating, FIG. 3, and appropriate frequencies of light, FIG. 5, 26-28, these results may be obtained. Such a coating is cured by exposure to ultra-violet light, instead of heat or exposure to air. Since this curing process is almost instantaneous, requiring (for example) an average of 1.5 seconds per light (FIG. 5), both time and energy are conserved. Curing lights used may be high pressure mercury lamps, mercury lamps doped with gallium or iron, or in combination as required. Lamps may be powered by direct application of voltage, by microwaves, or by radio-waves.

Referring to FIG. 3, a coating is prepared using a mixture of photoinitiators sufficient to encompass all necessary frequencies of light. These are used to work with the pairs of lights in FIG. 5, 26-28. Photoinitiators are compounds that absorb ultra-violet light and use the energy of that light to promote the formation of a dry layer of coating. In addition, the coating must contain a combination of oligomer and monomers such that necessary corrosion resistance is obtained. Oligomers are molecules containing several repeats of a single molecule. Monomers are substances containing single molecules that can link to oligomers and to each other. Proper choice of monomer also promotes adhesion to a properly prepared surface.

Polymerization, in particular acrylate double bond conversion and induction period, can be affected by the choice of oligomers, photoinitiators, inhibitors, and pigments, as well as UV lamp irradiance and spectral output. In comparison to clear coat formulations, the presence of pigments has made curing much more complex due to the absorption of the UV radiation by the pigment. Thus, the use of variable wavelength UV sources, along with matching of absorption characteristics of photoinitiators with UV source spectral output, can allow for curing of pigmented formulations.

Light sources used for UV curing: include arc lamps, such as carbon arc lamps, xenon arc lamps, mercury vapor lamps, tungsten halide lamps, lasers, the sun, sunlamps, and fluorescent lamps with ultra-violet light emitting phosphors. Medium pressure mercury and high pressure xenon lamps have various emission lines at wavelengths which are absorbed by most commercially available photoinitiators. In addition, mercury arc lamps can be doped with iron or gallium. Alternatively, lasers are monochromatic (single wavelength) and can be used to excite photoinitiators which absorb at wavelengths that are too weak or not available when using arc lamps. For instance, medium pressure mercury arc lamps have intense emission lines at 254 nm, 265 nm, 295 nm, 301 nm, 313 nm, 366 nm, 405/408 nm, 436 nm, 546 nm, and 577/579 nm. Therefore, a photoinitiator with an absorbance maximum at 350 nm may not be a efficiently excited using a medium pressure mercury arc lamp, but could be efficiently initiated using a 355 nm Nd:YVO4 (Vanadate) solid-state lasers. Commercial UV/Visible light sources with varied spectral output in the range of 250-450 nm may be used directly for curing purposes; however wavelength selection can be achieved with the use of optical bandpass filters. Therefore, as described herein, the user can take advantage of the optimal photoinitiator absorbance characteristics.

Regardless of the light source, the emission spectra of the lamp must overlap the absorbance spectrum of the photoinitiator. Two aspects of the photoinitator absorbance spectrum need to be considered. The wavelength absorbed and the strength of absorption (molar extinction coefficient). For example, the photoinitiators HMPP and TPO in DAROCUR® 4265 (from Ciba Specialty Chemicals 540 White Plains Road, Tarrytown, N.Y., U.S.A.) have absorbance peaks at 270-290 nm and 360-380 nm, while MMMP in IRGACURE® 907 (from Ciba Specialty Chemicals 540 White Plains Road, Tarrytown, N.Y., U.S.A.) absorbs at 350 nm and IRGACURE® 500 (which is a blend of IRGACURE® 184 (from Ciba Specialty Chemicals 540 White Plains Road, Tarrytown, N.Y., U.S.A.) and benzophenone) absorbs between 300 nm and 450 nm.

The addition of pigment to a formulation increases the opacity of the resulting coating and can affect any through curing abilities. Furthermore, the added pigment can absorb the incident curing radiation and thereby affect the performance of the photoinitiator. Thus, the curing properties of opaque pigmented coatings can depend on the pigment present, individual formulation, irradiation conditions, and substrate reflection. Therefore consideration of the respective UV/Vis absorbance characteristics of the pigment and the photoinitiator can be used to optimize UV curing of pigmented coatings. Generally, photoinitiators used for curing pigmented formulations have a higher molar extinction coefficient between the longer wavelengths (300 nm-450 nm) than those used for curing clear formulations. Although, the presence of pigments can absorb radiation both in the UV and visible light regions, thereby reducing absorption suitable for radiation curing, phosphine oxide type photoinitiators, for example but not limited to bis acylphosphine oxide, are effective in pigmented, including, by way of example only, black, UV curable coating materials. Phosphine oxides also find use as photoinitiators for white coatings.

The mercury gas discharge lamp is the UV source most widely used for curing, as it is a very efficient lamp with intense lines UV-C (200-280 nm) radiation, however it has spectral emission lines in the UV-A (315-400 nm) and in the UV-B (280-513 nm) regions. The mercury pressure strongly affects the spectral efficiency of this lamp in the UV-A, UV-B and UV-C regions. Furthermore, by adding small amounts (doping) of silver, gallium, indium, lead, antimony, bismuth, manganese, iron, cobalt and/or nickel to the mercury as metal iodides or bromides, the mercury spectrum can be strongly changed mainly in the UV-A, but also in the UV-B and UV-C regions. Doped gallium gives intensive lines at 403 and 417 nm; whereas doping with iron raises the spectral radiant power in the UV-A region of 358-388 nm by a factor of 2, while because of the presence of iodides UV-B and UV-C radiation are decreased by a factor of 3 to 7. As discussed above, the presence of pigments in a coating formulation can absorb incident radiation and thereby affect the excitation of the photoinitiator. Thus, it is desirable to tailor the UV source used with the pigment dispersions and the photoinitiator , photoinitiator mixture or photoinitiator/co-initiator mixture used. For instance, by way of example only, an iron doped mercury arc lamp (emission 358-388 nm) is ideal for use with photoinitator IRGACURE® 500 (absorbance between 300 and 450 nm).

In addition, multiple lamps with a different spectral characteristics, or sufficiently different in that there is some spectral overlap, can be used to excite mixtures of photoinitiator or mixtures of photoinitatiors and co-initiators. For instance, by way of example only, the use of a iron doped mercury arc lamp (emission 358-388 nm) in combination with a pure mercury arc lamp (emission 200-280 nm). The order in which the excitation sources are applied can be adventitiously used to obtain enhanced coating characteristic, such as, by way of example only, smoothness, shine, adhesion, abrasion resistance and corrosion resistance. Initial exposure of the coated surface with the longer wavelength source is beneficial, as it traps the filler particle in place and initiates polymerization near the surface, thereby imparting a smooth and adherent coating. Following this with exposure to the higher energy, shorter wavelength radiation enables for a fast cure of the remaining film that has been set in place by the initial polymerization stage.

Automotive parts may be properly cleaned and prepared using conventional technology. In particularly this involves extensive degreasing and washing. Referring to FIG. 4 the coating is then applied using either HVLP or electrostatic technology, this is the same technology used to apply conventional coatings. Alternative applications might involve dipping, flow, or curtain coating of parts. Referring to FIG. 5, the coating is then exposed to single UV light or an arrangement of lights used to obtain complete three dimensional curing. After curing the part does not require any cooling step, or time for solvent evaporation to occur, thus the part is available for immediate packing and shipping.

EXAMPLES

Example 1

In an embodiment of this composition approximately 26% of aliphatic urethane triacrylate blended with 1,6-hexanediol acrylate (EBECRYL® 264, from UCB Surface Specialties, Brussels, Belgium), 18% of 2-phenoxyethyl acrylate, 7% of propoxylated glyceryl triacrylate, 26% of isobomyl acrylate, 9% methacrylate ester derivative (EBECRYL® 168, from UCB Surface Specialties, Brussels, Belgium), 6% 2-hydroxy-2-methyl-1-phenyl-propan-1-one, and 2% of a mixture of diphenyl (2,4,6-trimethylbenzoyl) phosphine oxide, oligo (2-hydroxy -2-methyl-1-(4-(1-methylvinyl)phenyl) propanone), 2,4,6,-trimethylbenzophenone, and 4-methylbenzophenone, (ESACURE® KTO 46, from Lamberti S.p.A., Gallarate (Va.), Italy), 4% of black pigment dispersion (PC 9317 from Elementis, Staines, UK) and 2% amorphous silicon dioxide are mixed to form a black coating. All components are combined using either a conventional mixer with a sawtooth blade or a helical mixer, until a smooth coating is obtained. This coating may be applied by HVLP or electrostatic bell and cured by UV light.

Example 2

In an embodiment of this composition a clear coating is prepared that is 37.5% of a blend bisphenol epoxy acrylate with 25% trimethylolpropane triacrylate (EBECRYL® 3720-TP25, from UCB Surface Specialties, Brussels, Belgium), 34.1% 2-phenoxyethyl acrylate, 15.8% trimethylolpropane triacrylate, 7.3% methacrylate ester derivative (EBECRYL® 168, from UCB Surface Specialties, Brussels, Belgium), and 5.3% of IRGACURE® 500 (from Ciba Specialty Chemicals 540 White Plains Road, Tarrytown, N.Y., U.S.A.). A mixture of solid pigment dispersions is prepared using rutile titanium dioxide bonded to a modified acrylic (PC 9003 from Elementis, Staines, UK) to which 1.2% of a similarly bonded carbon black (PC 9317 from Elementis, Staines, UK) is added. To the clear coating is added 10.1% of the pigment dispersion mixture, 1% amorphous silicon dioxide prepared with polyethylene wax (SYLOID® RAD 2005, from the Grace Davison division of WR Grace & Co., Columbia, Md., U.S.A.), 0.2% synthetic amorphous silica with organic surface treatment (SYLOID® RAD 2105, from the Grace Davison division of WR Grace & Co., Columbia, Md., U.S.A.), and 2.1% diphenyl (2,4,6-trimethylbenzoyl) phosphine oxide. These additions are dispersed throughout the clear coating by a helical mixer until a smooth coating is produced. This coating may be applied by HVLP and cured by UV light.

Example 3

In another embodiment of this composition 67% of isobomy acrylate is blended with 16% rutile titanium dioxide bonded to a modified acrylic (PC 9003 from Elementis, Staines, UK), 1% diphenyl (2,4,6-trimethylbenzoyl) phosphine oxide, 2% of IRGACURE® 500 (from Ciba Specialty Chemicals 540 White Plains Road, Tarrytown, N.Y., U.S.A.), 8% amorphous silicon dioxide prepared with polyethylene wax (LANCO MATTE 2000®, from Lubrizol, Wickliffe, Ohio U.S.A), 4% amine acrylate (CN386, from Sartomer, Exton, Pa., U.S.A.), and 2% amorphous silicon dioxide prepared with polyethylene wax (SYLOID® RAD 2005, from the Grace Davison division of WR Grace & Co., Columbia, Md., U.S.A.). All components are combined using either a conventional mixer with a sawtooth blade or a helical mixer, until a smooth coating is obtained. This coating may be applied by HVLP and cured by UV light. CN386 (from Sartomer, Exton, Pa., U.S.A.) is a difunctional amine coinitiator which, when used in conjunction with a photosensitizer such as benzophenone, promotes rapid curing under UV light.

Example 4

A further embodiment is the procedure used for making a clear coat. The components of the coatings composition are mixed under air, as the presence of oxygen prevents premature polymerization. It is desired that exposure light be kept to a minimum, in particularly the use of sodium vapor lights should be avoided. However, the use of darkroom lighting may be an option. The components used in the manufacture of the coating composition which come in contact with monomers and coating mixture, such as mixing vessels and mixing blades, should be made of stainless steel or plastic, preferably polyethylene or polypropylene. Polystyrene and PVC should be avoided, as the monomers and coating mixture will dissolve them. In addition, contact of the monomers and coating mixture with mild steel, alloys of copper, acids, bases, and oxidizers should be avoided. Furthermore, brass fittings must be avoided, as they will cause premature polymerization or gelling. For the manufacture of clear coatings it is only essential to obtain thorough mixing, and consequently the control of shear is not necessary. Adequate mixing of the clear coating composition can be obtained after 1-3 hours using a ⅓ horse power (hp) mixer and a 50 gallon cylindrical tank. Smaller quantities, up to 5 gallons, can be adequately mixed after 3 hours using a laboratory mixer (1/15-1/10 hp). Round walled vessels are desired as this avoids accumulation of solid oligomer in corners and any subsequent problems associated with incomplete mixing. Another, parameter is that the mixers blades should be placed off of the bottom of the mixing vessel, at a distance of one half of the diameter of the mixer. The oligomers are added to the mixing vessel first, and if necessary the oligomers are gently warmed to aid in handling. Oligomers should not be heated over 120° F., therefore if warming is needed the use of a temperature controlled heating oven or heating mantle is recommended. Band heaters should be avoided. Monomers and colloidal suspensions are added next, in any order, followed by the ester/monomer adhesion promoters. Photoinitiators are added last to ensure that the time the complete composition is exposed to light is minimized. With the mixing vessel shielded from light exposure the mixing is then carried out after all the components are added. After mixing, there are air bubbles present and the coating may appear cloudy. These bubbles rapidly dissipate, leaving a clear coating composition. As a final step, prior to removing the coating composition from the mixing vessel, the bottom of the mixing vessel is scraped to see if any un-dissolved oligomer is present. This is done as a precaution to ensure thorough mixing has taken place. If the composition is thoroughly mixed then the coating composition is filtered through a 1 micron filter using a bag filter. The composition is then ready for use.

Example 5

A further embodiment is the manufacture procedure for pigmented coatings. Here a mixer of sufficient power and configuration is used to create laminar flow and efficiently bring the pigment dispersions against the blades of the mixer. For small laboratory quantities below 400 mLs, a laboratory mixer or blender is sufficient, however for quantities of up to half of a gallon a $\frac{1}{15}$-$\frac{1}{10}$ hp laboratory mixer can be used, but mixing will take several days. For commercial quantities, a helical or saw-tooth mixer of at least 30 hp with a 250 gallon round walled, conical bottomed tank may be used. To make a pigmented composition a clear coating composition is mixed first, see example 4. The pigment dispersion mixtures are premixed prior to addition to the clear coat composition as this ensures obtaining the correct color. The premixing of the pigments dispersions is easily achieved by shaking the pigments dispersion in a closed container, while wearing a dust mask. The fillers and the premixed pigments/pigment dispersions are then added to the clear coat composition and mixed for 1½ to 2 hours. Completeness of mixing is determined by performing a drawdown and checking for un-dissolved pigment. This is accomplished by drawing off a small quantity of the pigmented mixture from the bottom of the mixing tank and applying a thin coating onto a surface. This thin coating is then examined for the presence of any pigment which had not dissolved. The mixture is then run through a 100 mesh filter. A thoroughly mixed pigmented coating composition will show little or no un-dissolved pigment.

Example 6

Another embodiment is the incorporation of nano-particulates into a coating composition by mixing 26% of aliphatic urethane triacrylate blended with 1,6-hexanediol acrylate (EBECRYL® 264, from UCB Surface Specialties, Brussels, Belgium), 18% of 2-phenoxyethyl acrylate, 7% of propoxylated glyceryl triacrylate, 26% of isobornyl acrylate, 9% methacrylate ester derivative (EBECRYL® 168, from UCB Surface Specialties, Brussels, Belgium), 6% 2-hydroxy-2-methyl-1-phenyl-propan-1-one, and 2% of a mixture of diphenyl (2,4,6-trimethylbenzoyl) phosphine oxide, oligo (2-hydroxy-2-methyl-1-(4-(1-methylvinyl)phenyl)propanone), 2,4,6,-trimethylbenzophenone, and 4-methylbenzophenone, (ESACURE® KTO 46, from Lamberti S.p.A., Gallarate (VA), Italy), 4% of black pigment dispersion (PC 9317 from Elementis, Staines, UK), 1% nanometer sized alumina particles, and 1% amorphous silicon dioxide are mixed to form a black coating. All components are combined using either a conventional mixer with a sawtooth blade or a helical mixer, until a smooth coating is obtained. This coating may be applied by HVLP or electrostatic bell and cured by UV light.

Example 7

Still another embodiment is the process for coating an oil filter external surface with an actinic radiation curable, substantially all solids composition as described in example 1, using a black pigment dispersion. A process begins by attaching an oil filter to a rotatable spindle, and then attaching this combination to a conveyer belt system. Note that rotation of the rotatable spindle/oil filter assembly during the coating procedure ensures a complete coating of the oil filter surface. The rotatable spindle/oil filter assembly is then moved via the conveyer belt system into the coating application section, locating the rotatable spindle/oil filter assembly in the vicinity of electrostatic spraying system. The electrostatic spraying system has three spray heads arranged to ensure top, bottom and side coverage of the object being coated. Rotation of the spindle/oil filter assembly begins prior to spraying of the coating composition (described in example 1) from the three spray heads. The coating composition is then applied simultaneously from the three electrostatic spray heads, while the spindle/oil filter assembly continues to rotate. The coated spindle/oil filter assembly is then transported by the conveyer belt into a curing chamber located further down the process line. The curing chamber has two sets of doors which are closed during curing to protect operators form exposure to UV radiation. Inside the curing chamber the three sets of UV lamps are arranged to ensure top, bottom and side exposure to the UV radiation. Furthermore each UV lamp set contains two separate lamp types; one a mercury arc lamp and the other a mercury arc lamp doped with iron, to ensure proper curing. Therefore there are actually six lamps with in the curing chamber. Note that this three dimensional curing can be achieved by using only two lamps, one a mercury arc lamp and the other a mercury arc lamp doped with iron, with a mirror assembly to ensure exposure to the top, bottom and sides. Once inside the curing chamber the doors close and the spindle/oil filter assembly is again rotated. The mercury arc lamp doped with iron is then activated for the partial curing stage, and then the mercury arc lamp is activated for full cure. Note that the mercury arc lamp doped with iron does not need to be completely off before the mercury arc lamp is turned on. Both lamps are turned off and rotation of the spindle/oil filter assembly is stopped. The doors on the other side of the curing chamber are opened and the fully cured oil filter with a black pigmented corrosion resistant coating is then moved via the conveyer belt to a packaging area away from the curing chamber. The oil filter is then removed from the rotatable spindle, packed and shipped.

Example 8

Still another embodiment is the process for coating a damper external surface with an actinic radiation curable, substantially all solids composition as described in example 6, using a blue pigment dispersion. A process begins by attaching an damper to a rotatable spindle, and then attaching this combination to a conveyer belt system. Note that rotation of the rotatable spindle/damper assembly during the coating procedure ensures a complete coating of the damper surface. The rotatable spindle/damper assembly is then moved via the conveyer belt system into the coating application section, locating the rotatable spindle/damper assembly in the vicinity of electrostatic spraying system. The electrostatic spraying system has three spray heads arranged to ensure top, bottom and side coverage of the object being coated. Rotation of the spindle/damper assembly begins prior to spraying of the coating composition (described in example 6) from the three spray heads. The coating composition is then applied simultaneously from the three electrostatic spray heads, while the spindle/damper assembly continues to rotate. The coated spindle/damper assembly is then transported by the conveyer belt into a curing chamber located further down the process line. The curing chamber has two sets of doors which are closed during curing to protect operators form exposure to UV radiation. Inside the curing chamber the three sets of UV lamps are arranged to ensure top, bottom and side exposure to the UW radiation. Furthermore each UV lamp set contains two separate lamp types; one a mercury arc lamp and the other a mercury arc lamp doped with iron, to ensure proper curing. Therefore there are actually six lamps with in the curing chamber. Note that this three dimensional curing can be achieved by using only two lamps, one a mercury arc lamp and the other a mercury arc lamp doped with iron, with a mirror assembly to ensure exposure to the top, bottom and sides. Once inside the curing chamber the doors close and the spindle/damper assembly is again rotated. The mercury arc lamp doped with iron is then activated for the partial curing stage, and then the mercury arc lamp is activated for full cure. Note that the mercury arc lamp doped with iron does not need to be completely off before the mercury arc lamp is turned on. Both lamps are turned off and rotation of the spindle/damper assembly is stopped. The doors on the other side of the curing chamber are opened and the fully cured damper with a blue pigmented corrosion resistant coating is then moved via the conveyer belt to a packaging area away from the curing chamber. The damper is then removed from the rotatable spindle, packed and shipped.

Example 9

A further embodiment is testing the stability of the UV curable coating described in example 1. The stability of the cured composition coated onto an oil filter, as described in example 7, to resistance to motor vehicle liquids, in particular engine oil was conducted using an immersion test. The test involves dipping the coated and cured oil filter into a bath containing the engine oil at temperature of 120° C. The coated and cured oil filter is kept in this temperature bath for 24 hours and removed. After removing the coated and cured oil filter from the temperature bath a thumbnail under pressure is dragged across the surface in an attempt to damage the surface. Any indication of damage is looked for, and if no damage is observed the coated and cured oil filter is placed back into the bath for further testing.

All percentages given are by weight. EBECRYLs® are available from UCB Surface Specialties, Brussels, Belgium. SYLOIDs® are available from the Grace Davison division of WR Grace & Co., Columbia, Md, U.S.A. Cited solid pigment dispersions are available from Elementis, Staines, UK. IRGACURE® and DAROCUR® photoinitiators are available ® from Ciba Specialty Chemicals 540 White Plains Road, Tarrytown, N.Y., U.S.A. LANCO MATTE 2000® is available from Lubrizol, Wickliffe, Ohio U.S.A. CN386 and CN990 are available from Sartomer, Exton, Pa., U.S.A. ESA-CURE® KTO 46 is available from Lamberti S.p.A., Gallarate (Va.), Italy.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An actinic radiation curable, substantially all solids coating composition consisting essentially of a mixture of 0-40% by weight of oligomers, 5-68% by weight of monomers, 3-15% by weight of free radical photoinitiators, co-photoinitiators, 0.5-11% by weight of fillers, 3-15% by weight of polymerizable pigment dispersions, optionally at least one corrosion inhibitor, optionally at least one flow and slip enhancer, and optionally at least one curing booster; wherein the polymerizable pigment dispersions are comprised of at least one pigment attached to an activated resin; and wherein the composition has a viscosity suited for application to a surface using spraying without the addition of heat.

2. The actinic radiation curable, substantially all solids coating composition of claim 1, wherein the oligomers are selected from a group consisting of epoxy acrylates, epoxy diacrylate/monomer blends, silicone acrylate, aliphatic urethane triacrylate/monomer blends, fatty acid modified bisphenol A acrylates, bisphenol epoxy acrylates blended with trimethylolpropane triacrylate, aliphatic urethane triacrylates blended with 1, 6-hexanediol acrylate, and combinations thereof.

3. The actinic radiation curable, substantially all solids coating composition of claim 1, wherein the monomers are selected from a group consisting of trimethylolpropane triacrylate, 2-phenoxyethyl acrylate, isobornyl acrylate, propoxylated glyceryl triacrylate, methacrylate ester derivatives, and combinations thereof.

4. The actinic radiation curable, substantially all solids coating composition of claim 1, wherein the monomers are selected from a group consisting of trimethylolpropane triacrylate, 2-phenoxyethyl acrylate, methacrylate ester derivatives, and combinations thereof.

5. The actinic radiation curable, substantially all solids coating composition of claim 1, wherein the photoinitiators are selected from a group consisting of diphenyl (2, 4, 6-trimethylbenzoyl) phosphine oxide, a thioxanthone, dimethyl ketal, benzophenone, 1-hydroxycyclohexyl phenyl ketone, 2-hydroxy-2-methyl-1-phenyl-propan-1-one, 2, 4, 6,-trimethylbenzophenone, 4-methylbenzophenone, oligo (2-hydroxy-2-methyl-1-(4-(1-methylvinyl)phenyl)propanone), amine acrylates, and combinations thereof.

6. The actinic radiation curable, substantially all solids coating composition of claim 1, wherein the fillers are selected from a group consisting of amorphous silicon dioxide prepared with polyethylene wax, synthetic amorphous silica with organic surface treatment, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof.

7. The actinic radiation curable, substantially all solids coating composition of claim 1, wherein the activated resins are selected from a group consisting of acrylate resins, methacrylate resins, and vinyl resins.

8. The actinic radiation curable, substantially all solids coating composition of claim 1, wherein the pigments are selected from a group consisting of carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red.

9. The actinic radiation curable, substantially all solids coating composition of claim 1, wherein the polymerizable pigment dispersions are selected from the group consisting of carbon black attached to modified acrylic resins, rutile titanium dioxide attached to modified acrylic resins, and combinations thereof.

10. The actinic radiation curable, substantially all solids coating composition of claim 1, further comprising a corrosion inhibitor present in an amount up to about 3% by weight.

11. The actinic radiation curable, substantially all solids coating composition of claim 1, further comprising a flow and slip enhancer present in an amount up to about 3% by weight.

12. The actinic radiation curable, substantially all solids coating composition of claim 11, wherein the flow and slip enhancer is an acrylated silicone.

13. The actinic radiation curable, substantially all solids coating composition of claim 1, further comprising a curing booster present in an amount up to about 0.5% by weight.

14. The actinic radiation curable, substantially all solids coating composition of claim 13, wherein the curing booster is thioxanthone.

15. The actinic radiation curable, substantially all solids coating composition of claim 1, wherein the composition has been applied to a surface and wherein exposure of the coated surface to actinic radiation the surface coating becomes fully cured.

16. An article of manufacture comprising the completely cured coated surface of claim 15, wherein the article of manufacture is selected from the group consisting of a motor vehicle, a motor vehicle part, a motor vehicle accessory, gardening equipment, a lawnmower, and a lawnmower part.

17. The article of manufacture of claim 16 wherein the article of manufacture is a motor vehicle part.

18. The article of manufacture of claim 17 wherein the motor vehicle part is an underhood part.

19. The article of manufacture of claim 18 wherein the underhood part is selected from the group consisting of an oil filter, a damper, a battery casing, an alternator casing, and an engine manifold.

* * * * *